US008356157B2

(12) United States Patent
Inoue et al.

(10) Patent No.: US 8,356,157 B2
(45) Date of Patent: *Jan. 15, 2013

(54) VIRTUALIZATION SYSTEM AND AREA ALLOCATION CONTROL METHOD

(75) Inventors: Shintaro Inoue, Odawara (JP); Yutaka Takata, Ninomiya (JP); Mikio Fukuoka, Odawara (JP); Eiju Katsuragi, Odawara (JP); Hisaharu Takeuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/137,533

(22) Filed: Aug. 24, 2011

(65) Prior Publication Data
US 2011/0314240 A1 Dec. 22, 2011

Related U.S. Application Data

(63) Continuation of application No. 12/923,156, filed on Sep. 7, 2010, now Pat. No. 8,032,731, which is a continuation of application No. 11/604,689, filed on Nov. 28, 2006, now Pat. No. 7,814,289.

(30) Foreign Application Priority Data

Sep. 28, 2006 (JP) ................................. 2006-263940

(51) Int. Cl.
*G06F 12/00* (2006.01)
(52) U.S. Cl. .. 711/170; 711/162; 711/172; 711/E12.001
(58) Field of Classification Search .................. 711/162, 711/170, 172, E12.01
See application file for complete search history.

(56) References Cited

U.S. PATENT DOCUMENTS

| 6,606,690 | B2 | 8/2003 | Padovano |
| 7,213,124 | B2 | 5/2007 | Serizawa et al. |
| 7,257,694 | B2 | 8/2007 | Serizawa et al. |
| 2002/0078174 | A1 | 6/2002 | Sim et al. |
| 2002/0156984 | A1 | 10/2002 | Padovano |

(Continued)

FOREIGN PATENT DOCUMENTS

EP  0 375 188  6/1990

(Continued)

OTHER PUBLICATIONS

Office Action issued by the Japanese Patent Office on Oct. 25, 2011 in the corresponding Japanese Patent Application No. 2006-263940 (2 pages).

(Continued)

*Primary Examiner* — Matthew Bradley
*Assistant Examiner* — Mehdi Namazi
(74) *Attorney, Agent, or Firm* — Stites & Harbison, PLLC; Juan Carlos A. Marquez, Esq.; Nicholas B. Trenkle

(57) ABSTRACT

A virtualization system, upon judging that a write operation from a higher-level device is an operation to write in the format of the virtual volume, even when the write position of the write operation is in a virtual area different from a virtual area to which an allocated actual area has been allocated, if there is an unused area in the allocated actual area, writes management information to the unused area according to the write operation, and if there is no unused area in the allocated actual area, newly allocates an unallocated actual area, and writes management information to the newly allocated actual area according to the write operation.

18 Claims, 20 Drawing Sheets

U.S. PATENT DOCUMENTS

| | | |
|---|---|---|
| 2003/0110263 A1 | 6/2003 | Shillo |
| 2003/0236884 A1 | 12/2003 | Yamamoto et al. |
| 2004/0172501 A1 | 9/2004 | Ukai et al. |
| 2004/0193827 A1 | 9/2004 | Mogi et al. |
| 2004/0194061 A1 | 9/2004 | Fujino |
| 2004/0260861 A1 | 12/2004 | Serizawa et al. |
| 2005/0021562 A1 | 1/2005 | Idei et al. |
| 2007/0271430 A1* | 11/2007 | Maki et al. .................. 711/162 |
| 2008/0010234 A1* | 1/2008 | Nakagawa et al. ............. 707/1 |
| 2008/0016311 A1* | 1/2008 | Harada ........................ 711/170 |

FOREIGN PATENT DOCUMENTS

| | | |
|---|---|---|
| JP | 2004-265110 | 9/2004 |
| JP | 2005-011316 | 1/2005 |
| JP | 2005-031929 | 2/2005 |

OTHER PUBLICATIONS

European Search Report of Patent Application No. 07251384.9 mailed Apr. 23, 2010.

Machine Translation of JP-2006-263940.

* cited by examiner

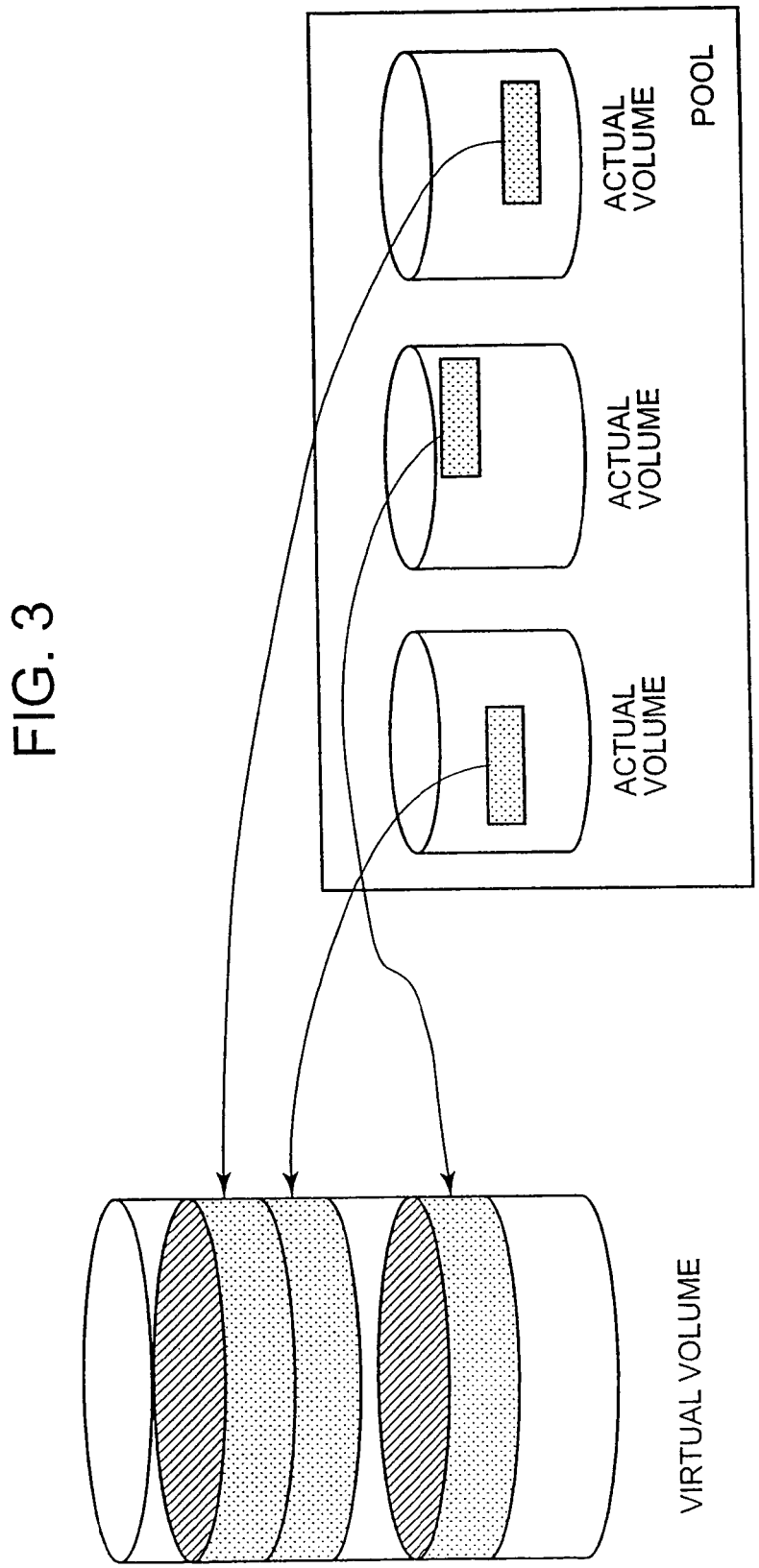

FIG. 5

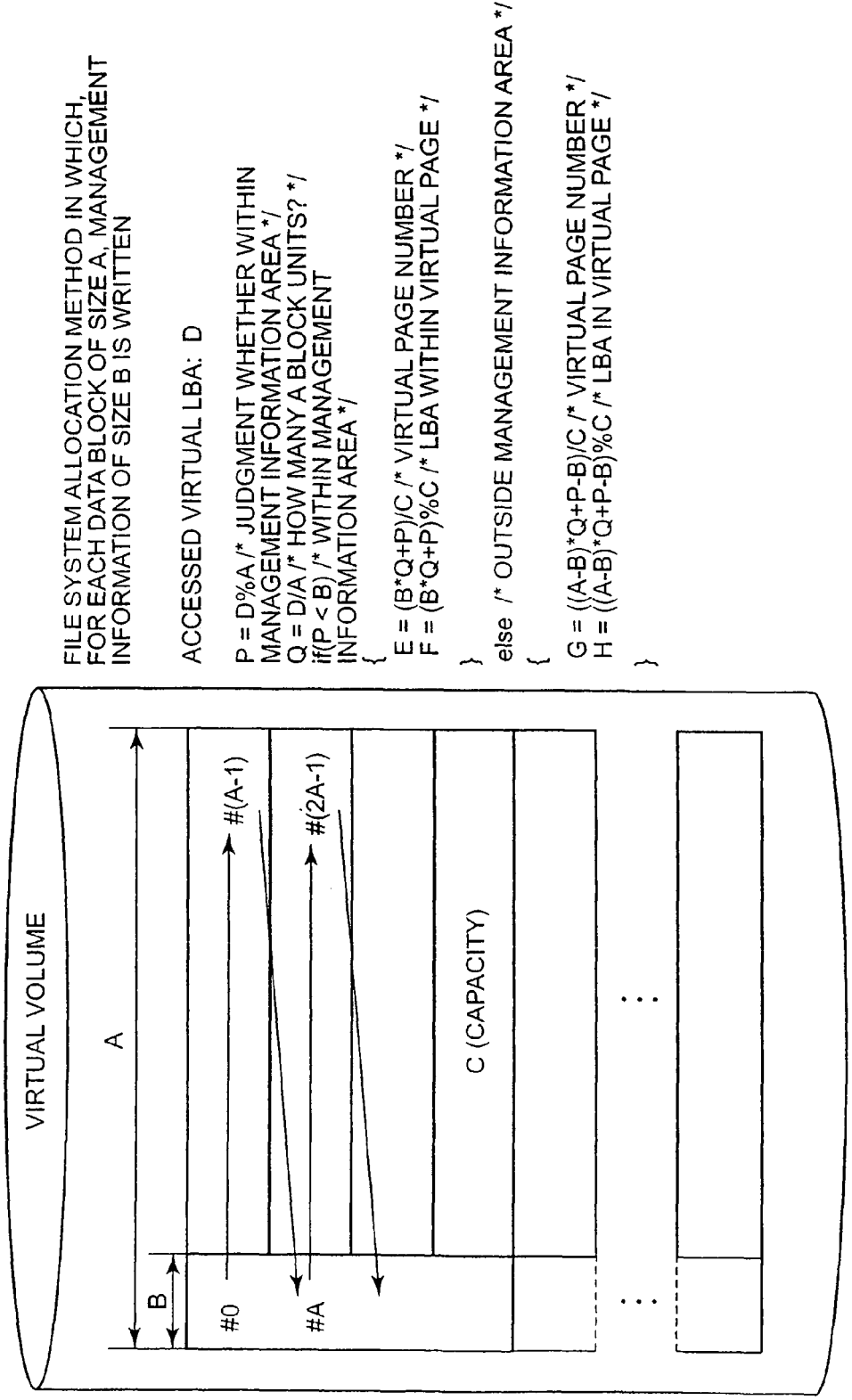

FILE SYSTEM ALLOCATION METHOD IN WHICH, FOR EACH DATA BLOCK OF SIZE A, MANAGEMENT INFORMATION OF SIZE B IS WRITTEN

ACCESSED VIRTUAL LBA: D

P = D%A /* JUDGMENT WHETHER WITHIN MANAGEMENT INFORMATION AREA */
Q = D/A /* HOW MANY A BLOCK UNITS? */
if(P < B) /* WITHIN MANAGEMENT INFORMATION AREA */
{
  E = (B*Q+P)/C /* VIRTUAL PAGE NUMBER */
  F = (B*Q+P)%C /* LBA WITHIN VIRTUAL PAGE */
}
else /* OUTSIDE MANAGEMENT INFORMATION AREA */
{
  G = ((A-B)*Q+P-B)/C /* VIRTUAL PAGE NUMBER */
  H = ((A-B)*Q+P-B)%C /* LBA IN VIRTUAL PAGE */
}

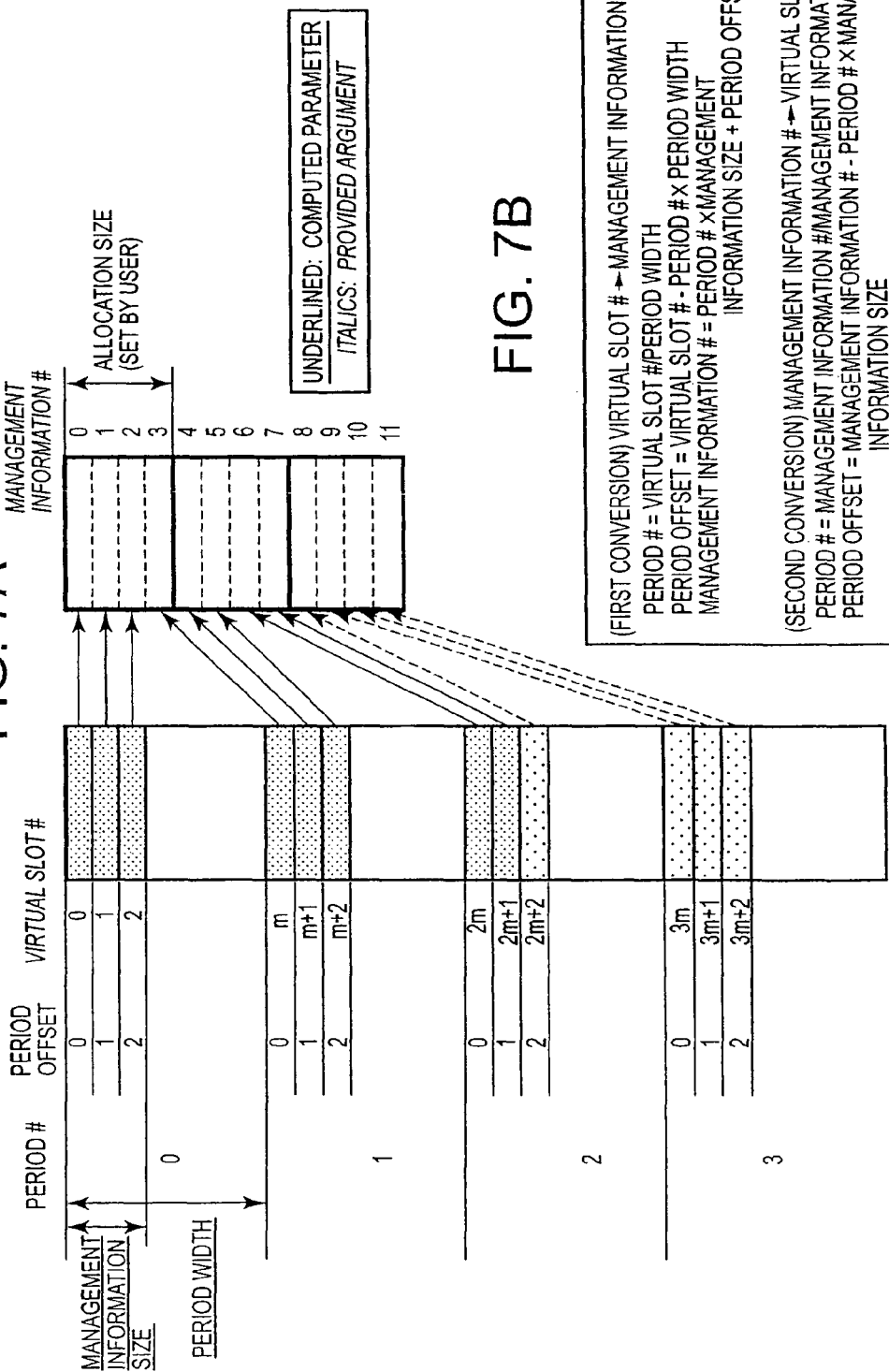

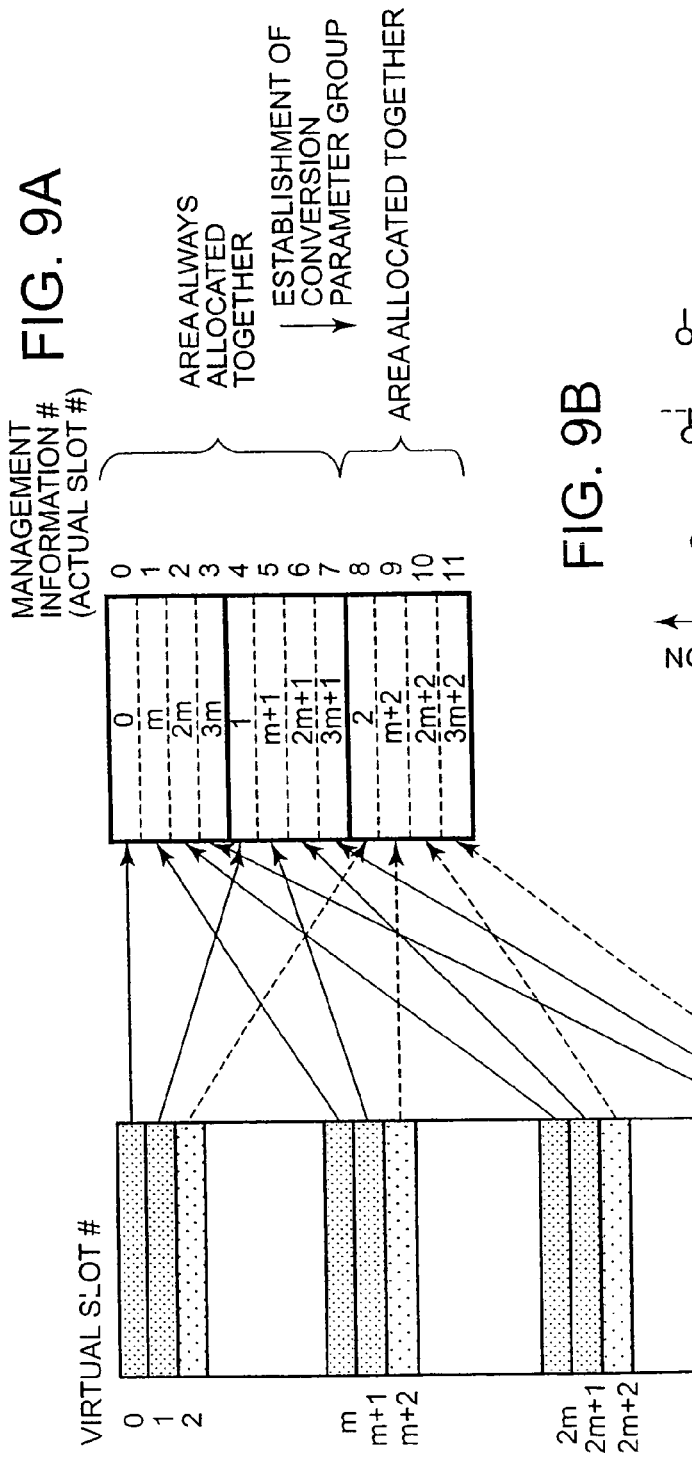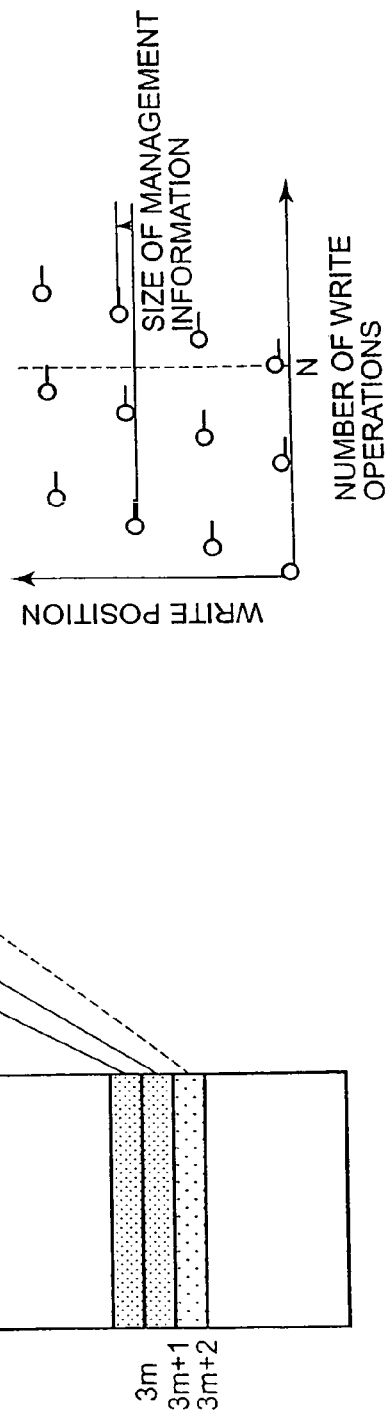

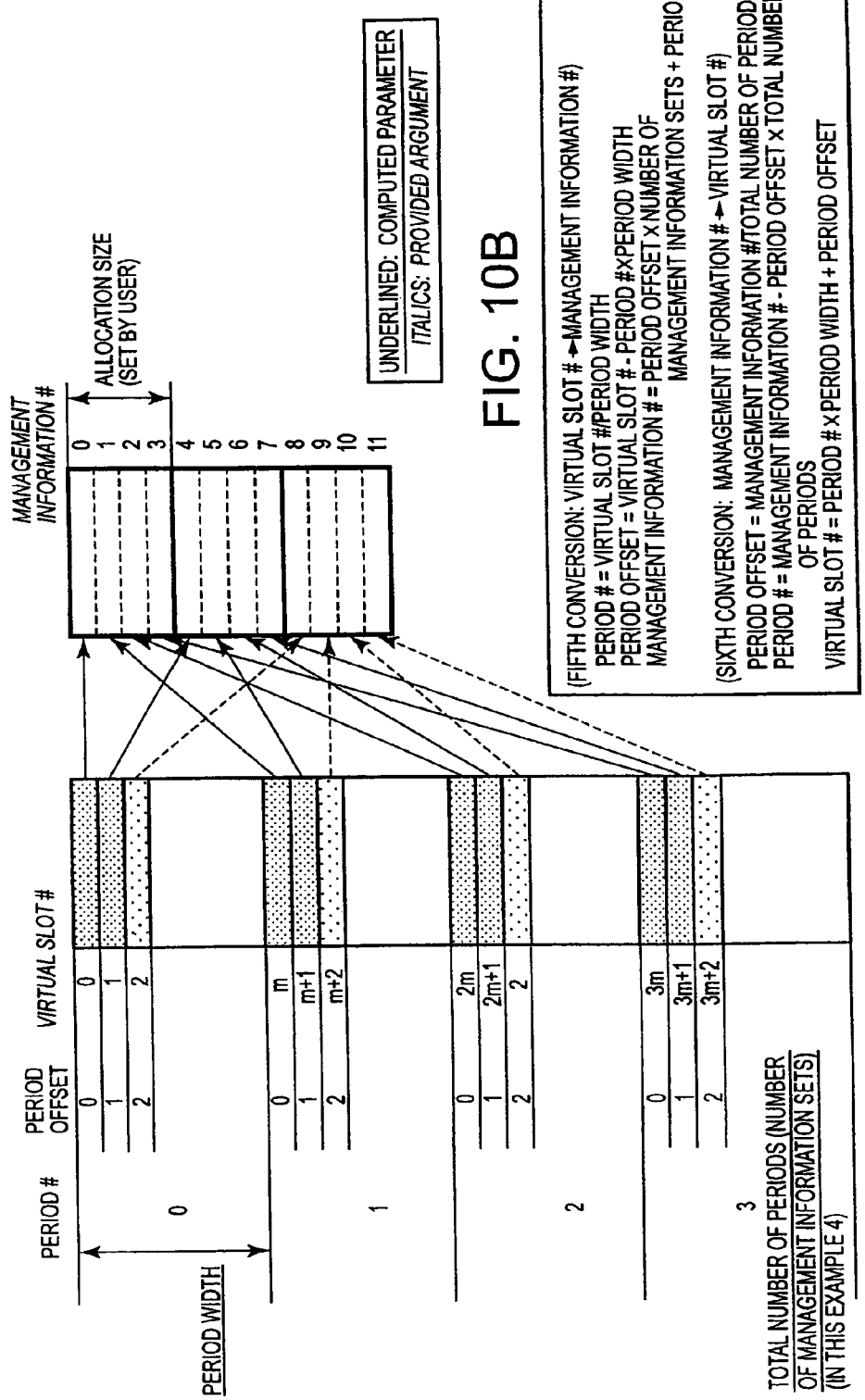

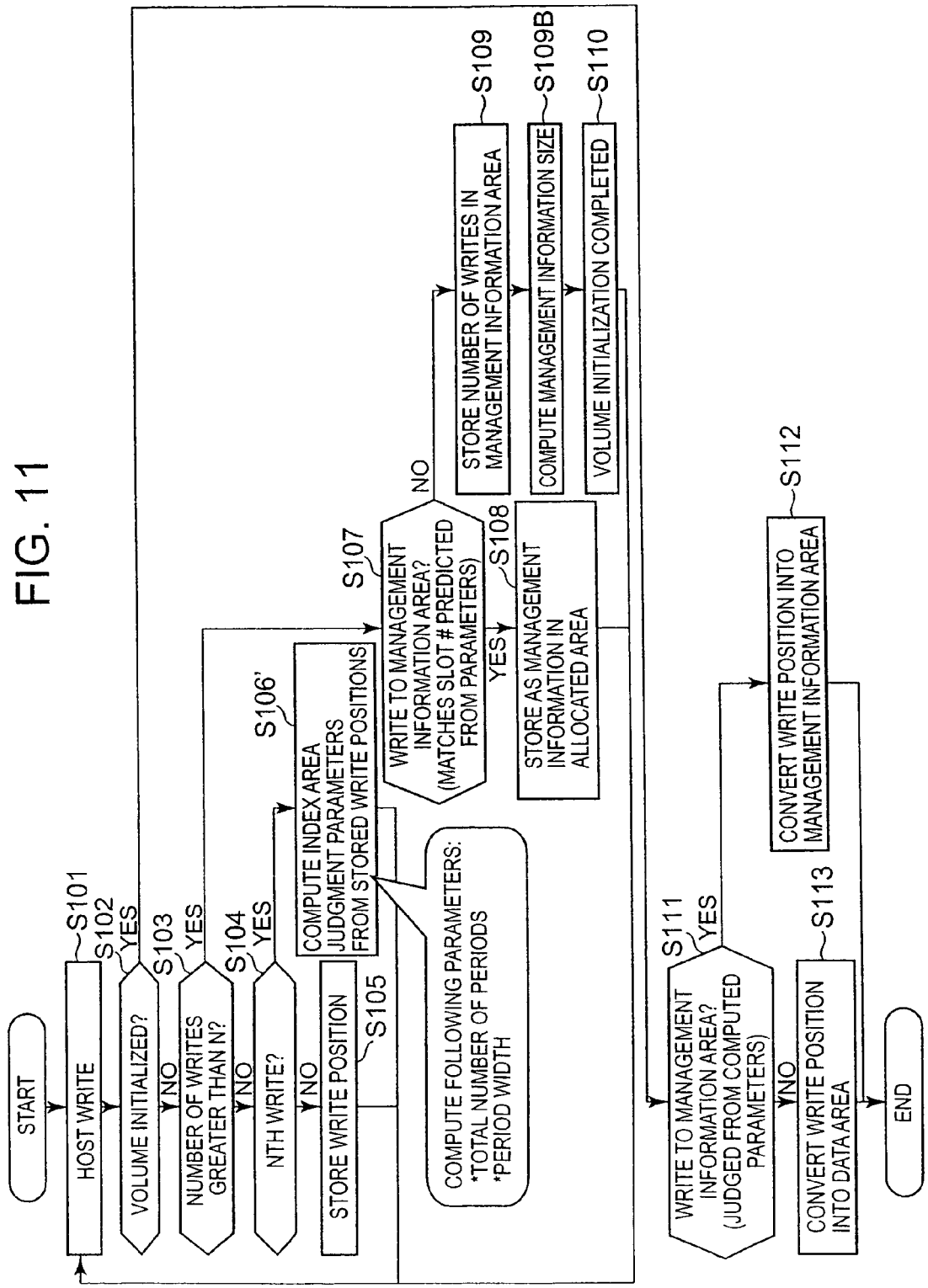

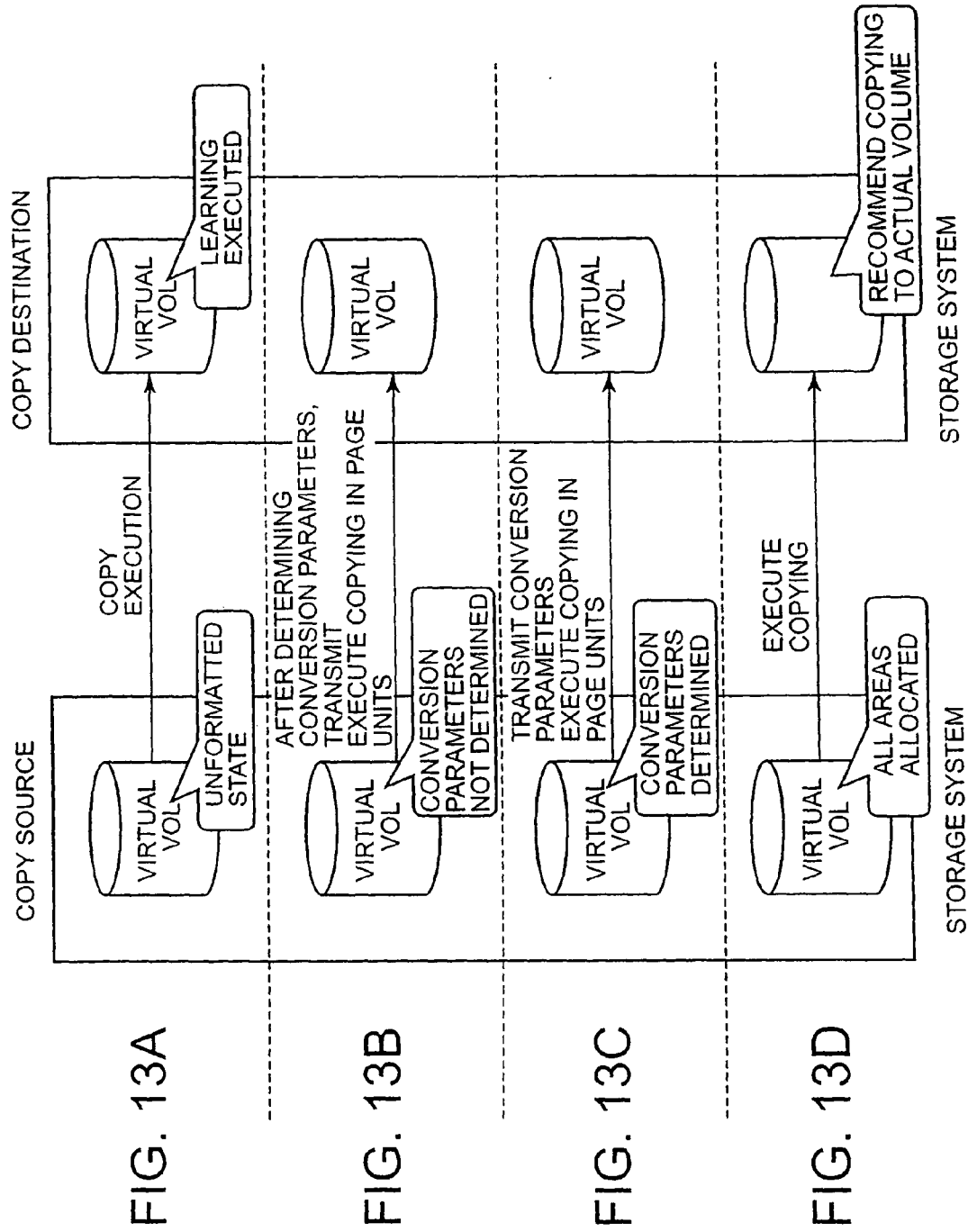

VIRTUALIZATION SYSTEM AND AREA ALLOCATION CONTROL METHOD

CROSS-REFERENCE TO PRIOR APPLICATION

The present application is a Continuation of U.S. application Ser. No. 12/923,156 filed on Sep. 7, 2010, now U.S. Pat. No. 8,032,731 which is a Continuation of U.S. application Ser. No. 11/604,689 filed on Nov. 28, 2006, now U.S. Pat. No. 7,814,289. Priority is claimed from U.S. application Ser. No. 12/923,156 filed on Sep. 7, 2010, which claims the priority of U.S. application Ser. No. 11/604,689 filed on Nov. 28, 2006, now U.S. Pat. No. 7,814,289, which claims the priority of Japanese Patent Application 2006-263940, filed on Sep. 28, 2006, the entire disclosure of which is incorporated herein by reference.

BACKGROUND

This invention relates to a technique for dynamically allocating storage areas to virtual logical volumes used by a higher-level device.

There is for example the technology disclosed by Japanese Patent Laid-open No. 2005-31929. According to this technology, a management server, connected to a plurality of servers and a storage device, manages a physical storage area of the storage device, used by the plurality of servers, as a virtual area (storage pool), and, in response to a command received from a server to allocate an area equal to or greater than the unallocated area, releases at least a portion of the area allocated to another server, and allocates the area to the server issuing the area allocation command.

However, virtualization systems, which provide virtual logical volumes (virtual volumes) to higher-level devices (for example, to host computers or to storage systems), are well-known. Virtualization systems may be storage systems, or may be server machines, or may be switching devices which configure networks (for example a SAN (Storage Area Network)).

FIG. 3 shows an example of a method by which a virtualization system allocates an actual storage area (hereafter called an actual area) to a virtual volume.

In other words, an actual area, which is a unit of allocation, is an area in a logical volume with an actual presence (hereafter an "actual volume"). An actual volume is a logical storage device provided with storage space from one or a plurality of physical storage devices (for example, hard disk drives or flash memory). One or a plurality of actual volumes are managed as a pool. When an operation occurs to write to a certain address in a virtual volume (hereafter a "virtual address"), the virtualization system selects an unallocated actual area from among the plurality of actual areas in the pool, allocates the selected actual area to an area containing the certain address (hereafter a "virtual area"), and writes the data for writing to the certain virtual address to the allocated actual area (for example, the storage capacity of the virtual area and the storage capacity of the actual area may be the same). When an operation occurs to write to the virtual area containing the certain virtual address (to a prescribed virtual address range), data is written to the allocated actual area, and when an operation occurs to write to a virtual area different from the virtual area, another unallocated actual area is allocated to the other virtual area, and data is written to the other actual area.

When using this method, the following problem occurs. That is, in order for the higher-level device to use a virtual volume, the virtual volume must be formatted (initialized). In a file system format used by a virtual volume, management information of small size (meta-data; specifically, for example, superblocks, i-nodes, and similar) is written to the virtual volume, and the virtual address to which the management information is written is shifted at regular intervals. In this case, if actual areas are allocated using the above method, actual areas can be allocated appropriately as in the example of FIG. 4A, but in each of the allocated actual areas, there is the problem that the size of the unallocated area becomes large. That is, the problem of poor efficiency of use of storage capacity arises.

SUMMARY

Hence an object of this invention is to suppress the occurrence of unallocated areas in allocated actual areas in the file system format used by virtual volumes.

Other objects of the invention will become clear from the subsequent explanation.

As shown in the example of FIG. 4B, in a virtual volume format, if an actual area has already been allocated, the virtualization system packs and writes management information in allocated real areas each time a write operation occurs for the virtual volume. If there is no longer unused area in the actual area, a new unallocated actual area is allocated.

Specifically, a virtualization system comprises for example a judgment portion and an allocation control portion. The judgment portion judges whether a command from a higher-level device to write to the virtual volume is a command to write in the format of the virtual volume. If it is judged that the write command from the higher-level device is a command to write in the format, even if the position for writing of the write command is in a virtual area different from the virtual area to which the actual area has been allocated, if there is an unused area in the allocated actual area, the allocation control portion writes management information to the unallocated area according to the write command, and if there is no unused area in the allocated area, the allocation control portion newly allocates the unallocated actual area, and writes management information to the newly allocated actual area according to the write command.

Each of the above-described portions can be realized by means of hardware, a computer program, or a combination thereof (for example, a portion may be realized by a computer program, and the remainder realized by hardware). A computer program is read and executed by a prescribed processor. Upon the occasion of information processing performed by a computer program which has read a computer program, memory or other storage areas existing in hardware resources may be used as appropriate. Further, a computer program may be installed on a computer from a CD-ROM or other recording media, or may be downloaded to a computer via a communication network.

BRIEF DESCRIPTION OF THE DRAWINGS

FIG. 3 explains a method of allocation of real areas to a virtual volume;

FIG. 5 explains a method of calculating the virtual slot # from the access destination virtual LBA specified in an access request from a host computer;

FIG. 7A explains conversion parameter types in the first formatting method;

FIG. 7B shows a conversion formula between virtual slot # and management information # in the first formatting method;

FIG. 9A explains a method of storage in actual pages using a second formatting method;

FIG. 9B shows the relation between the host write position and the number of host write operations in the second formatting method;

FIG. 10A explains conversion parameter types in the second formatting method;

FIG. 10B shows a conversion formula between virtual slot # and management information # in the second formatting method;

FIG. 11 shows an example of the flow of processing performed by the IO control program 501;

FIG. 13A explains remote copy processing when the copy source virtual VOL is in an unformatted state;

FIG. 13B explains remote copy processing when in a state in which a conversion parameter group for the copy source virtual VOL has not been registered;

FIG. 13C explains remote copy processing when in a state in which a conversion parameter group for the copy source virtual VOL has been registered;

FIG. 13D explains remote copy processing when in a state in which the allocated ratio for the copy source virtual VOL exceeds a prescribed ratio;

DESCRIPTION OF THE PREFERRED EMBODIMENTS

Figure 1:
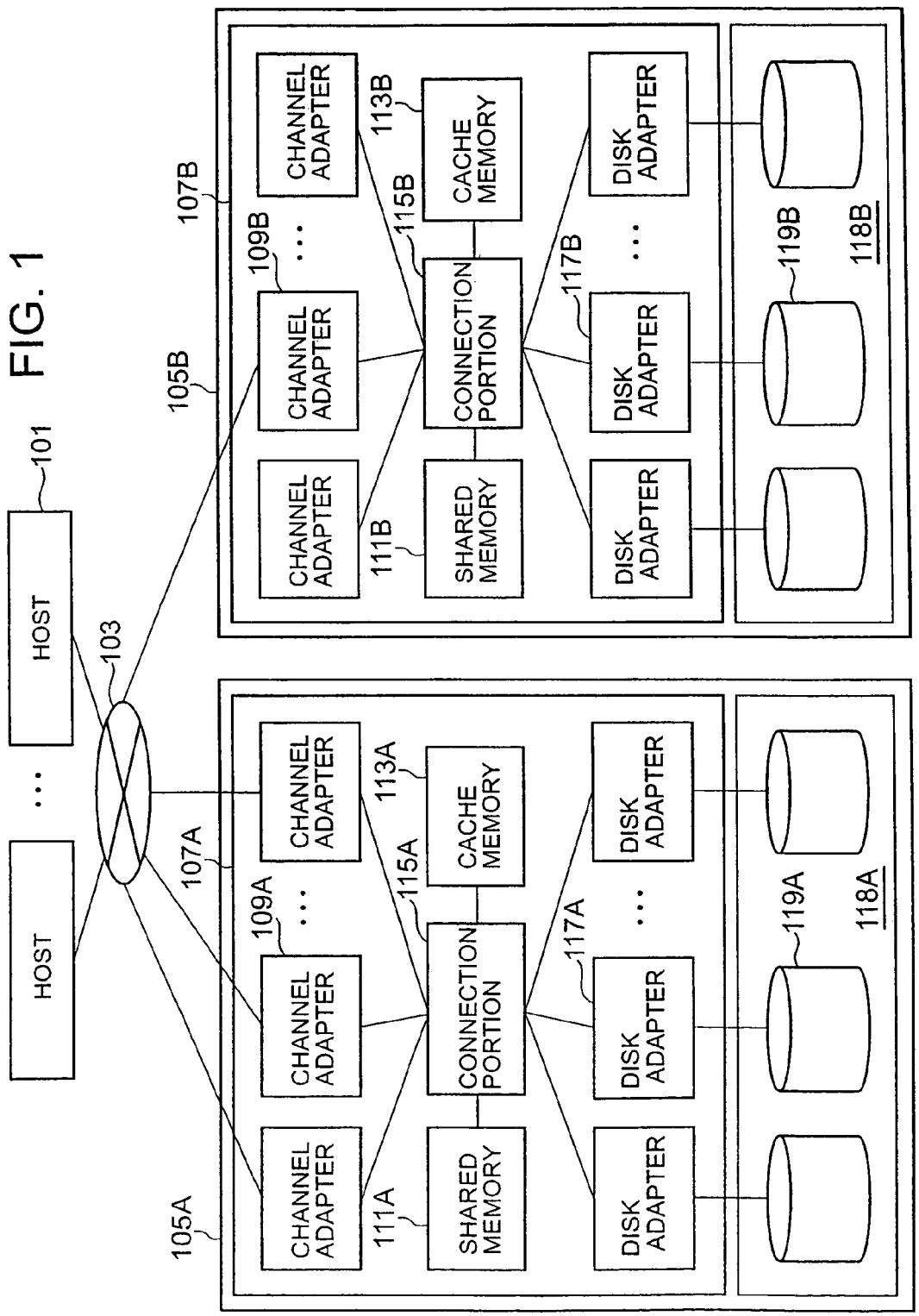
FIG. 1 shows the configuration of the computer system in one aspect of the invention.

FIG. 1 shows the configuration of the computer system of one aspect of the invention.

One or a plurality of host computers 101, a first storage system 105A, and a second storage system 105B are connected to a communication network (for example a SAN) 103.

The host computer 101 is a computer device comprising, for example, a CPU (Central Processing Unit), memory, and other information processing resources, and may for example be configured as a personal computer, workstation, mainframe, or similar.

The first storage system 105A and second storage system 105B can be configured with similar hardware configurations. Hence in FIG. 1, similar constituent components are assigned the same parent numbers. The child symbol "A" is appended to the parent numbers of the first storage system and of constituent components therein, and the child symbol "B" is appended to the parent numbers of the second storage systems and of constituent components therein. Below, both storage systems are explained. When distinguishing between the storage systems, the combination of parent numbers and child symbols is used; but when there is no particular need to distinguish between them, only the parent numbers are used in explanations, without using child symbols.

A storage system 105 can for example be a RAID system comprising numerous physical storage devices 119 arranged in an array. However, the storage system 105 is not limited to this, and can also be configured as an intelligent-type fiber channel switch with enhanced functionality. A storage system 105 can be broadly divided into a controller portion 107 and a storage portion 118.

The controller portion 107 comprises for example channel adapters (CHAS) 109, disk adapters (DKAs) 117, cache memory 113, shared memory 111, and a connection portion 115.

A CHA 109 is an interface device which performs data communication with the host computer 101 or with another storage system. A CHA 109 can be configured as a microcomputer system (for example, a circuit board) comprising, for example, a CPU, memory, and a plurality of communication ports. The plurality of communication ports comprises, for example, communication ports connected to the host computer 101 or to another storage system to enable communication, and communication ports connected to the connection portion 115. For example, a CHA 109 receives write requests from the host computer 101, writes the data to cache memory 113 according to the received write request, and commands the DKA 117 to write the data. Also, a CHA 109 receives read requests from the host computer 101, commands the DKA 117 to read the data according to the received read request, reads the data from cache memory 113 according to the command, and transmits the data to the host computer 101.

A DKA 117 is an interface device which performs data communication with physical storage devices 119. A DKA 117 can also be configured as a microcomputer system (for example a circuit board) comprising a CPU, memory, a plurality of communication ports, and similar. The plurality of communication ports comprise communication ports connected, in a manner enabling communication, to the physical storage devices 119, and communication ports connected to the communication portion 115. For example, in response to a write command from a CHA 109, a DKA 117 can write data stored in cache memory 113 to a physical storage device 119. Further, a DKA 117 can for example, in response to a read command from a CHA 109, read data from a physical storage device 119 according to this command and write the data to cache memory 113.

Cache memory 113 is for example volatile or non-volatile memory, and temporarily stores data received from the host computer 10 and data read from a physical storage device 119.

Shared memory 111 is for example volatile or non-volatile memory, which stores information (hereafter called "control information") which is referenced by a CHA 109 or DKA 117 to control a storage system 105. Types of control information are described in detail below.

A connection portion 115 interconnects the CHA 109, DKA 117, cache memory 113, and shared memory 111. The connection portion 115 can for example be configured as a high-speed bus such as an ultra-fast crossbar switch or similar for data transmission through high-speed switching operations.

A storage portion 118 comprises a plurality of physical storage devices 119. A physical storage device 119 can for example be a hard disk device, flexible disk device, magnetic tape device, semiconductor memory, optical disc device, or other device. A RAID group of prescribed RAID level can be configured from two or more physical storage devices 119. Using the storage space of two or more physical storage devices 119 comprised by a RAID group, an actual logical volume (actual volume) can be formed. One area in an actual volume (that is, an actual area) is allocated to a virtual volume to be provided to the host computer 101.

The above is the configuration of the computer system of this aspect. This configuration is an example; this invention is not limited to the configuration of FIG. 1, and other configurations may be adopted. For example, shared memory 111 and cache memory 113 need not be separate memory devices, and a shared memory area and cache memory area may be provided in a single memory device. Further, the configurations of the two storage systems 105A and 105B may be different. Also, the controller portion 107 may be a circuit board comprising a CPU, memory, and a plurality of communication ports (that is, a configuration simpler than that of the controller portion of FIG. 1). In this case, the CPU can execute the processing performed by a plurality of CHAs and DKAs.

Figure 2:
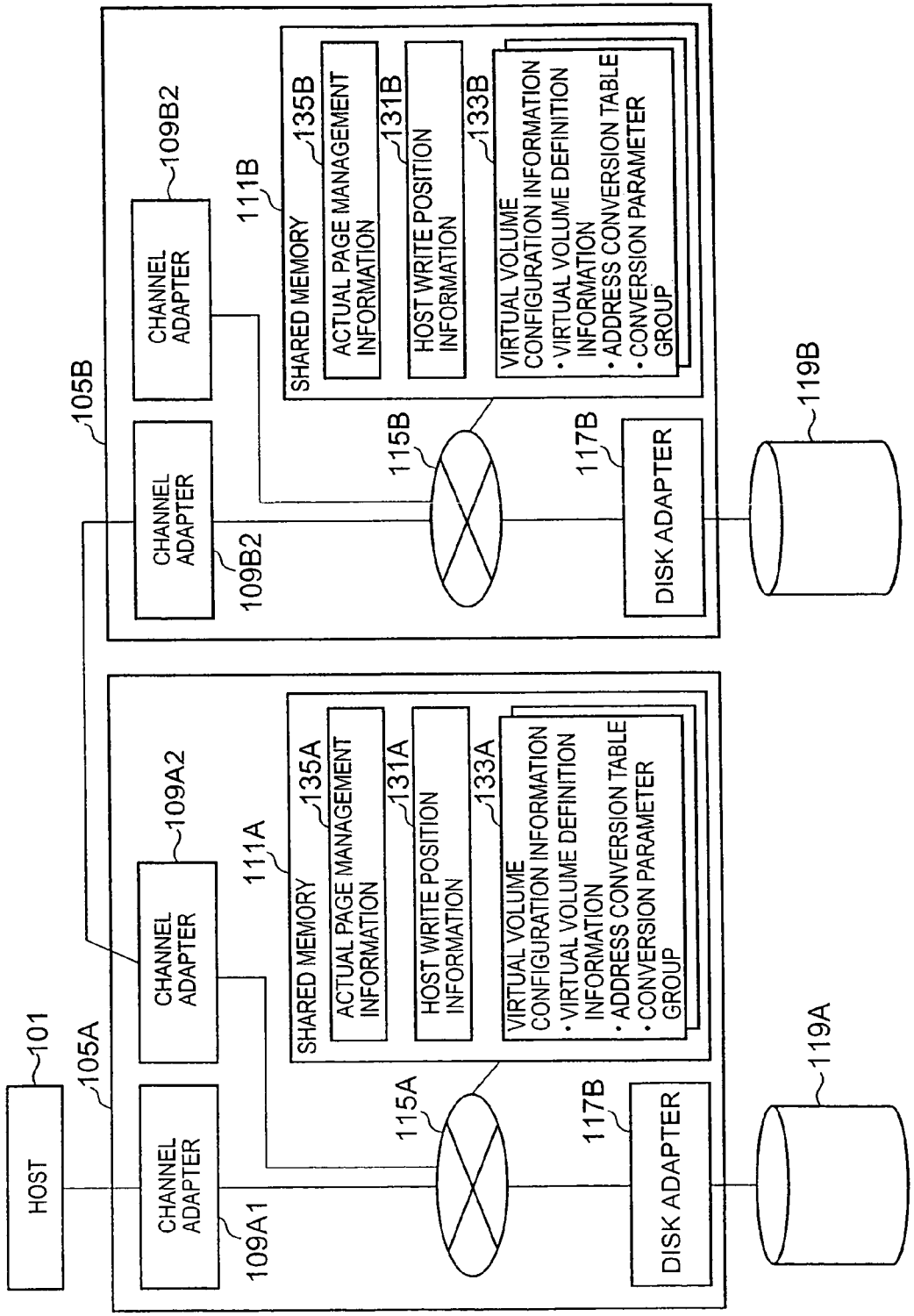
FIG. 2 shows the connection configuration of a first storage system and a second storage system, as well as types of control information stored in shared memory.

FIG. 2 shows the connection configuration of the first storage system and second storage system, and types of control information stored in shared memory.

Figure 20:
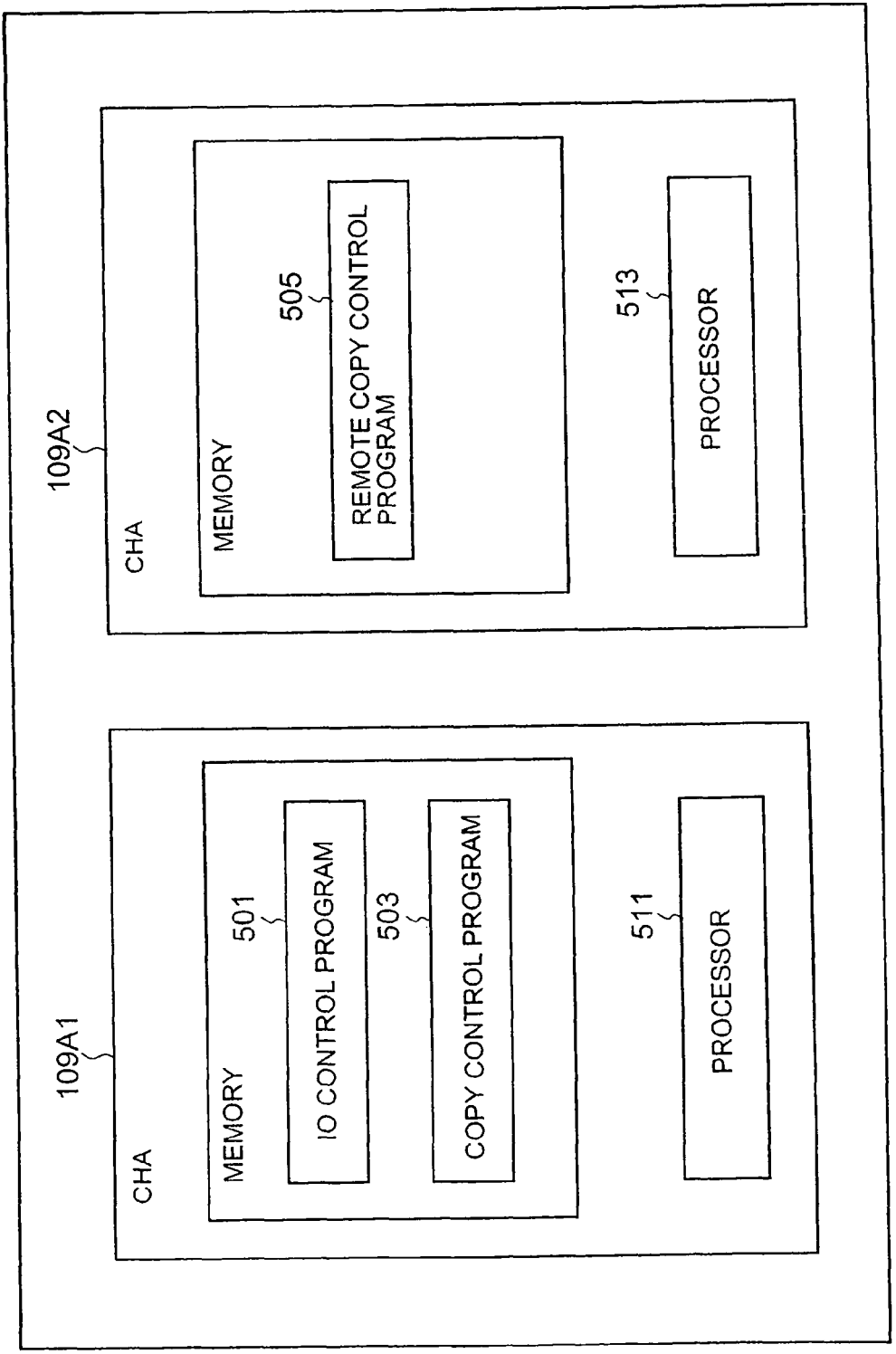
FIG. 20 shows an example of the configuration of CHAs 109A1 and 109A2.

The plurality of CHAs 109 can be broadly divided into CHAs to communicate with the other storage system 105, and CHAs to communicate with the host computer 101. Taking the first storage system 105A as a representative example, the plurality of CHAs 109A comprise CHAS 109A1 which communicate with the host computer 101, and CHAS 109A2 which communicate with the second storage system 105B. The CHAs 109A1 provide virtual volumes to the host computer 101, and, when there is a request to write to a certain virtual address of a virtual volume, can allocate an actual area. This can for example be performed by having the processor 511 installed in the CHA 109A1 execute the IO program 501, as shown in FIG. 20. The CHA 109A1 can perform data copying between logical volumes within the first storage system 105A. This can for example be performed by having the processor 511 installed in the CHA 109A1 execute the copy control program 503, as shown in FIG. 20. On the other hand, when copying data from a logical volume of the first storage system 105A (whether a virtual volume or an actual volume) to a logical volume of the second storage system 105B (whether a virtual volume or an actual volume), the CHA 109A2 can transmit data for copying to the second storage system 105B. This can for example be performed by having the processor 513 installed in the CHA 109A2 execute the remote copy control program 505, as shown in FIG. 20. Below, when a computer program is the subject of a sentence, it should be assumed that processing is actually being performed by the processor (for example a CPU) which executes the computer program.

As a method of allocation of an actual area to a virtual volume, the method explained with reference to FIG. 3 can be adopted. That is, an unallocated actual area is selected from a plurality of actual volumes belonging to a pool (that is, from a plurality of actual areas within the pool), and the selected actual area is allocated to a virtual area in the virtual volume. In the following explanation, for convenience, an area which is an allocation unit shall be called a "page", an actual area (one area in an actual volume) which is an allocation source shall be called an "actual page", and the virtual area which is the allocation destination (one area in the virtual volume) shall be called a "virtual page". The actual page and the virtual page are of the same size, and one actual page is allocated to one virtual page.

As types of control information stored in shared memory 111A, for example, there are actual page management information 135A, host write position information 131A, and virtual volume configuration information 133A.

The actual page management information 135A is information used to discriminate the plurality of actual pages as either already allocated to virtual pages, or not yet allocated. The actual page management information 135A comprises, for example, for each actual page, an actual page identifier, an actual volume identifier (for example, a logical unit number (LUN)) in which the actual page exists, and a status indicating whether the actual page has been allocated. The CHA 109A1 can identify unallocated actual pages by referencing the actual page management information 135A.

The host write position information 131A is information indicating the positions and virtual volumes for which write requests have been received. In other words, the host write position information 131A is a history of write destination information (host write information) specified by received write requests. A host write position can for example be expressed as a logical block address (LBA) or as a virtual slot number (hereafter sometimes written "virtual slot #"). A "slot" is an area of a page; one page comprises a plurality of slots. A "virtual slot" is one area in a virtual page. On the other hand, an "actual slot", described below, is an area in an actual page. A host write position may, in addition to the position specified by a write request (for example, in FIG. 7A, the virtual slot #0, m to begin writing, or similar), be a virtual slot # appended to the write request (for example, in FIG. 7A, the virtual slot #1, 2, and m+1, m+2, and similar).

The virtual volume configuration information 133A is information relating to the configuration of a virtual volume, and is prepared for each virtual volume. The virtual volume configuration information 133A comprises, for example, virtual volume definition information, an address conversion table, and a conversion parameter group.

Virtual volume definition information is information relating to definition of the virtual volume, and specifically, comprises for example a virtual volume identifier (for example, a LUN), virtual volume storage capacity, and virtual volume address range (virtual addresses of the beginning and of the end). A virtual address can be represented by a logical block address.

An address conversion table is a table used to manage the correspondence relation between virtual pages and actual pages, and is referenced in order to determine the actual page to be accessed when a virtual page is accessed. An address conversion table indicates, for example, for each virtual page, the virtual page number (virtual page #), status indicating whether an actual page has been allocated to the virtual page, and, if an actual page has been allocated, the number of the allocated actual page (actual page #). In this address conversion table, management is for each virtual page, but there is no management for each virtual slot. The correspondence between virtual slots and actual slots is calculated in calculations using a conversion parameter group, described below. By this means, the size of the address conversion table can be reduced compared with a case in which the correspondence between virtual slots and actual slots is managed by the address conversion table, and so the storage capacity consumed in shared memory 111A can be reduced.

A conversion parameter group is one or more types of parameters (conversion parameters) necessary to convert from a virtual slot # to an actual slot # (specifically, to a management information # or data #, described below), or to convert in the opposite direction from an actual slot # to a virtual slot #. Types of conversion parameters are described below.

Similar control information is also stored in the shared memory 111B of the second storage system 105B. Actual page management information 135B is prepared in advance, and other types of control information are generated as appropriate. The types of control information stored are explained below.

FIG. 5 explains a method of calculating a virtual slot # from an access destination virtual LBA specified by an access request from a host computer.

This figure explains a method of allocation for the case of a file system in which, for each block of data size A (for example, in byte units), management information of data size B is written (where A>B). Blocks are units managed by the OS (Operating System, for example UNIX (a registered trademark)) of the host computer 101. That is, data is written from the host computer 101 in block units. A slot is smaller than the data size of a block; for example, the total storage capacity of a plurality of slots may be equal to the data size of a single block. Further, the total storage capacity of a plurality of slots may be equal to the storage capacity of a single page.

Here, if the storage capacity of the virtual page is C (in for example megabyte units), then the IO control program 501 can calculate the virtual slot # corresponding to the access destination virtual LBA:D through the following flow of processing.

First, $$P = D \% A \quad (1)$$

That is, the remainder P when D is divided by A is calculated. P is a value used to judge whether a location is a location at which management information is written or is a location at which user data is written in a block of data size A. User data is data which is written or read by the host computer 101 after formatting has been completed.

Further, $$Q = D/A \quad (2)$$

That is, the quotient Q obtained when D is divided by A is calculated. Q is a value indicating the block number, counting in block units.

The value of P calculated using equation (1) is compared with the data size B. Below, depending on whether P<B (whether the access destination virtual LBA is a location at which management information is written, or is a location at which user data is written), the calculated equations are different.

That is, if P<B, then the following equations (3) and (4) are calculated:

$$E = (B \times Q + P)/C \quad (3)$$

$$F = (B \times Q + P) \% C \quad (4)$$

That is, the quotient E obtained by dividing (B×Q+P) by C, and the remainder F obtained when dividing (B×Q+P) by C, are each computed. E is the virtual page #, and F is the LBA in the virtual page with this virtual page #. The calculated values of E and F can be used, with the storage capacity C of the virtual page and the storage capacity of a virtual slot, to identify the virtual slot #. That is, if the storage capacity C of a virtual page is divided by the storage capacity of a virtual slot, the number of virtual slots in a virtual page is obtained, and upon multiplying the number of virtual slots by the virtual slot #, and adding the number of virtual slots corresponding to the value of F in one virtual page, then the virtual slot # from the beginning in the virtual volume is obtained. In this aspect, a virtual page #, virtual slot #, actual page #, and actual slot # are each given as consecutive integral numbers starting from 0, as in 0, 1, 2, . . . .

On the other hand, when the result of the above-described comparison of P and B is not P<B, then the following equations (5) and (6), $$G = ((A-B) \times Q + P - B)/C \quad (5)$$

$$H = ((A-B) \times Q + P - B) \% C \quad (6)$$

are calculated. That is, the quotient G obtained by dividing ((A−B)×Q+P−B) by C, and the remainder H obtained when dividing ((A−B)×Q+P−B) by C, are each calculated. G is the virtual page #, and H is the LBA in the virtual page with this virtual page #. Based on these calculated values of G and H, the virtual slot # can be calculated by a method similar to the above-described method using E and F.

By using the virtual slot # calculated in this way and conversion parameters calculated when formatting the virtual volume, the virtual slot # can be converted into the actual slot #.

However, the method of formatting a virtual volume differs depending on the file system using the virtual volume. For example, in addition to the first formatting method shown as an example in FIG. 6A and FIG. 6B, there is the second format example shown as an example in FIG. 9A and FIG. 9B.

In the case of the first formatting method, after one set of management information has been written consecutively from a certain virtual slot, consecutive writing of one management information set is repeated from the certain virtual slot to virtual slots shifted by prescribed intervals. By this means, a plurality of management information sets are written to the virtual volume at prescribed intervals.

In the case of the second formatting method, each portion of a plurality of management information sets is written at prescribed intervals, and then, the next portion of the plurality of management information sets is written at prescribed intervals, and this is repeated until the entirety of the plurality of management information sets has been written. Specifically, for example, the first portion of a first management information set is written to a first virtual slot, and the first portion of a second management information set is written to a second slot removed a prescribed number of virtual slots from the first virtual slot. After this has been performed for the first portion of the entirety of the management information, the second portion, following the first portion, of the first management information set is written to the third virtual slot following the first virtual slot, and the second portion of the second management information set is written to the fourth virtual slot, removed by the prescribed number of virtual slots from the second virtual slot. This processing is repeated for the plurality of management information sets, to write the plurality of management information sets to the virtual volume at prescribed intervals.

In both formatting methods, management information is written at prescribed intervals. Because the size of the management information written to actual pages allocated at the time of formatting is small, if no special measures are taken, there is the problem that a large amount of unallocated area remains in an actual page; but in this aspect, this problem can be resolved in the following way. After first allocating an actual page to a virtual volume, even when writing of management information portion occurs for each virtual volume, the management information portion is written in succession to the allocated actual page. By this means, the occurrence of an unallocated area in the actual page can be suppressed. The following is a detailed explanation for the examples of the first and second formatting methods. Here, what is written to one slot is a portion of the management information or a portion of user data, and so the expressions "management information portion" or "user data portion" are used as appropriate.

Figure 6A:
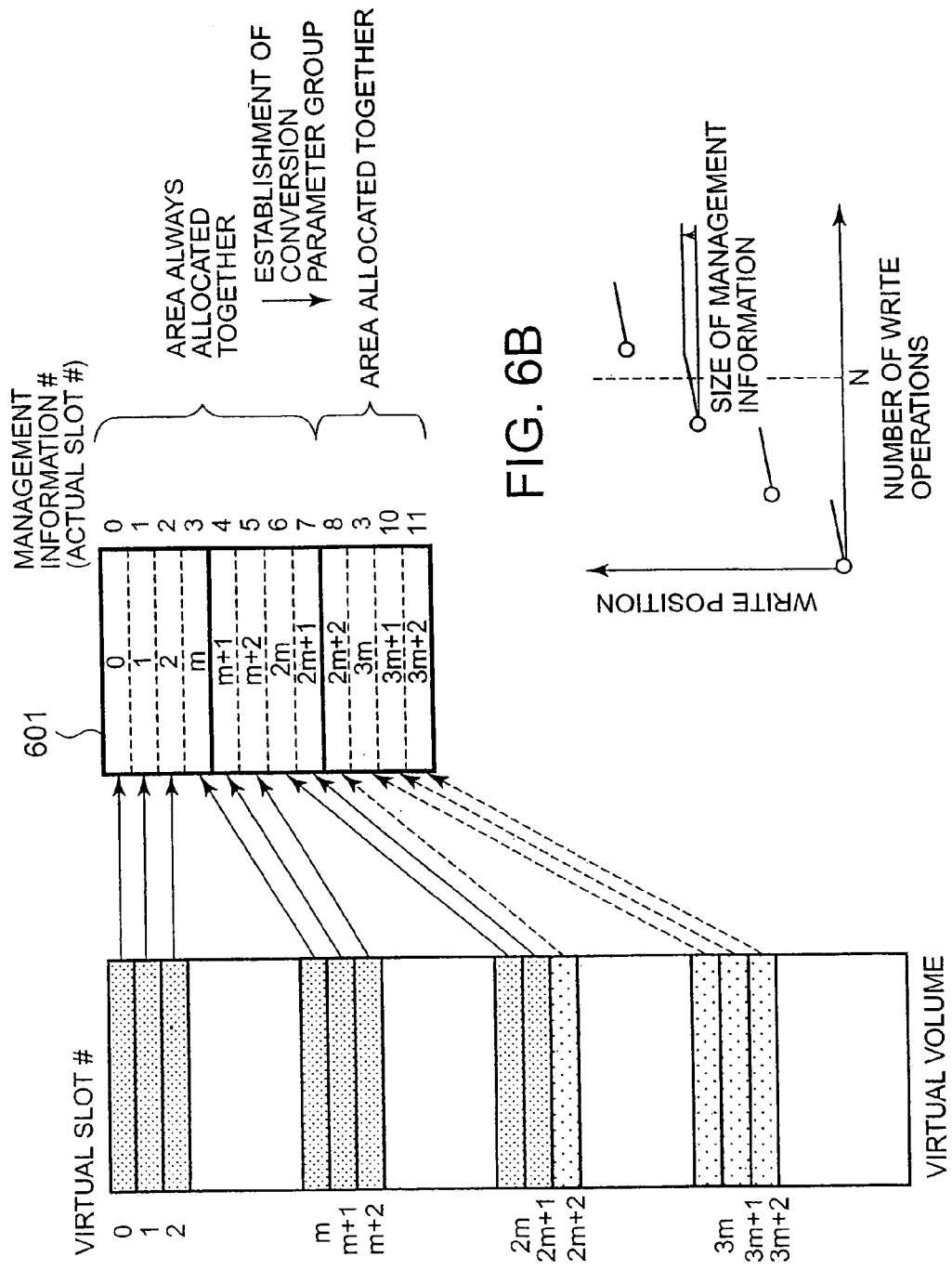
FIG. 6A explains a method of storage in actual pages using a first formatting method.
Figure 6B:
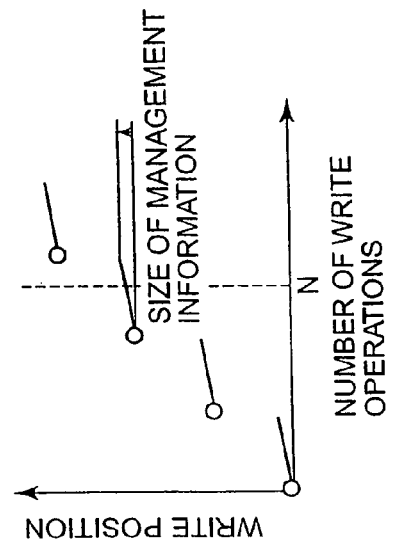
FIG. 6B shows the relation between the host write position and the number of host write operations in the first formatting method.

In the first formatting method, as shown in the example of FIG. 6A, when management information is written to virtual slots #0 to 2, management information is written to the upper three actual slots #0 to 2 of the actual page 601, comprised by the actual slots #0 to 3, and one actual slot #3 remains. Next, when management information is written to virtual slots # m to m+2, the management information portion written to virtual slot # m is written to the above remaining actual slot #3, and the remaining management information portion is written to the newly allocated actual slots #4 and 5 among the actual slots #4 to 7 comprised by the actual page 601. In this way, management information portions are written consecutively on one actual page. In FIG. 6A, an "area which is always allocated together" is an actual page which, after first receiving a write request for a virtual volume when the virtual volume is unformatted, is allocated before N write requests have been received; and "allocation of an area together" means allocation of a plurality of actual slots together by allocating an actual page. In FIG. 6A, "conversion parameter group establishment" means determination of each of the various parameters, described below, when N write requests are received. N is a threshold for the number of write requests received (in other words, the number of write commands from the host computer 101). The value of N can be the minimum number necessary for determination of the various parameters (see FIG. 6B), and specifically, is an integer equal to or greater than 2. Similar remarks apply to FIG. 9A and FIG. 9B. In FIG. 6A, the solid-line arrows from the virtual volume to each page indicate the results of allocation when N write requests have been received; the dashed-line arrows from the virtual volume to pages indicate the results of allocation when subsequent write requests are received. Similar remarks apply to FIG. 7A, FIG. 9A, and FIG. 10A.

FIG. 7A explains conversion parameter types calculated in the first formatting method.

The management information size and period width are conversion parameter types calculated in the first formatting method.

The "management information size" is the data size of management information. The management information size can for example be calculated by multiplying the number of consecutive virtual slots occupied by management information in one virtual page by the size of one virtual slot.

The "period width" is the interval between the leading virtual slot (which may be another virtual slot at a prescribed position) among the plurality of virtual slots occupied by a certain management information set, and the leading virtual slot (which may be another virtual slot at a prescribed position) among the plurality of virtual slots occupied by the next management information set. The period width can for example be represented by the difference in the numbers of leading virtual slots (for example, m−0). In general, the term "period" is used to express a time interval; but in this aspect, for convenience, the term is used to represent an interval between management information write destinations.

In the first formatting method, as explained above, after one management information set has been written consecutively, the next management information set is written consecutively, and so the minimum value of the above variable N can be set to 2. In other words, when in the unformatted state a write request is received twice, the management information size and period width can be calculated. In the first formatting method, the threshold N is not necessary; in this case, when the management information write destinations are not consecutive, the various conversion parameters may be computed. Below, write requests to a virtual volume may be called "host write commands". In FIG. 7A, "allocation size (user setting)" means that the page storage capacity may be a value which can be changed by the user.

Using these conversion parameters, a first conversion of a virtual slot # into a management information # can be performed, and conversely, a second conversion of a management information # into a virtual slot # can be performed. Conversion formulae for these conversions are given in FIG. 7B. That is:

(First conversion: virtual slot #→management information #)

period #=virtual slot #/period width period offset=virtual slot #−period #×period width management information #=period #×management information size+period offset (Second conversion: management information #→virtual slot #)

period #=management information #/management information size period offset=management information #−period #×management information size virtual slot #=period #×period width+period offset A "management information #" is the number of the actual slot in which the management information portion is written among the actual slot # s. When a plurality of management information sets are written, a plurality of intervals between management information sets occur; the period # is the number used to identify the number of the interval (period). The period offset indicates the virtual slot # when the leading virtual slot # is taken to be 0 in each period.

Figure 12A:
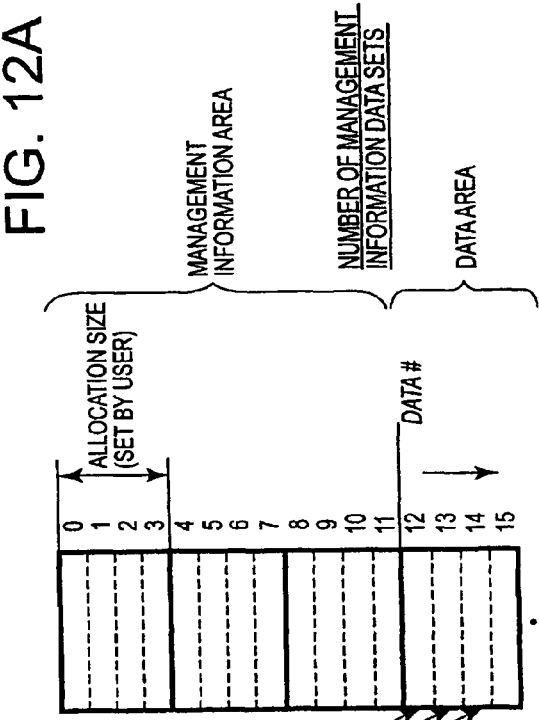
FIG. 12A explains a method of user data storage, and the management information area and data area.

In this aspect, for a management information #, there are data # s, as shown in FIG. 12A. A "data #" is an actual slot number in which a user data portion is written, among the actual slot # s. In this aspect, in a virtual volume, the collection of actual pages in which management information portions are written is a management information area, and the collection of actual pages in which user data portions are written is a data area. The plurality of virtual pages which each correspond to the plurality of actual pages comprised by a management information area are scattered in the virtual volume at fixed intervals. This is because management information is written periodically. The actual slot # of each actual slot of each actual page comprised by a management information area is a management information #, and the actual slot # of each actual slot of each actual page comprised by a data area is a data #. For example, as shown in FIG. 12A, when actual slot # s are from 0 to n (where n is an integer equal to or greater than 15), 0 to 11 are management information # s, and 12 to n are data # s.

Figure 12B:
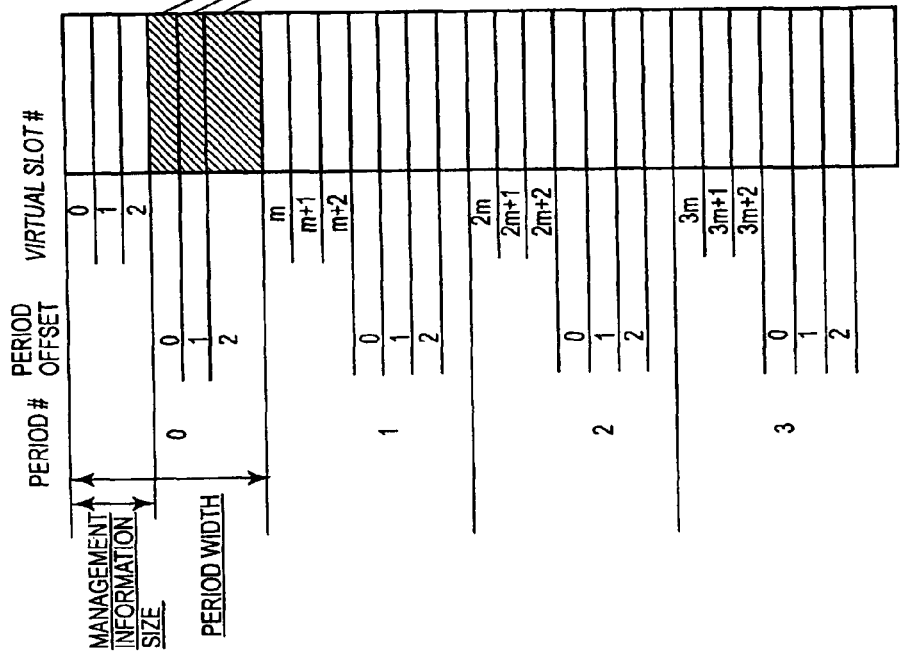
FIG. 12B shows a conversion formula between virtual slot # and data #.

FIG. 12B shows a conversion formula for a third conversion to convert a virtual slot # into a data #, and a conversion formula for a fourth conversion to convert a data # into a virtual slot #. That is, (Third conversion: virtual slot #→data #)

period #=slot #/period width period offset=slot #−period #×period width−management information size data #=period #×(period width−management information size)+period offset+number of management information data sets (Fourth conversion: data #→virtual slot #)

period #=(data #−number of management information data sets)/period width period offset=(data #−number of management information data sets)−period #×(period width−management information size)

virtual slot #=period #×period width+period offset

User data portions are packed and written to actual pages.

Figure 4A:
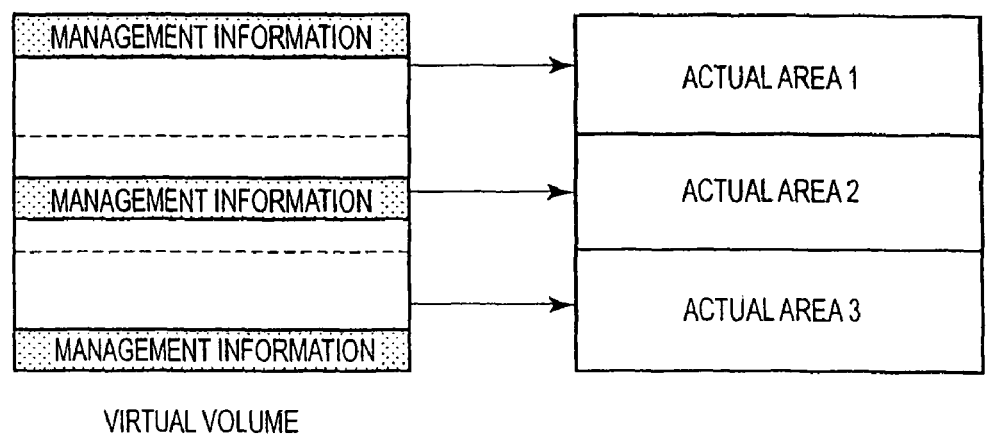
FIG. 4A explains a problem arising in allocation of real pages to a virtual volume.
Figure 4B:
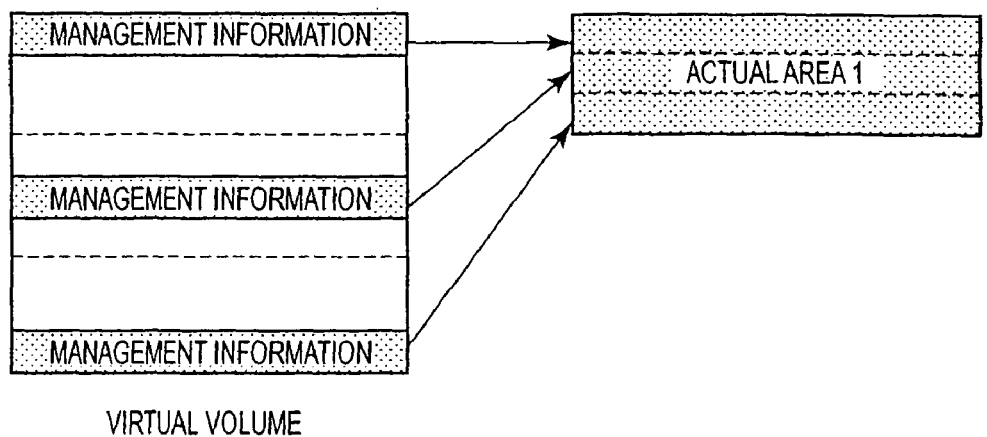
FIG. 4B is a summary of a method for resolving the problem.

The "number of management information data sets" is the number of management information sets, which may, due to the fact that management information is written at periodic intervals, be replaced with the number of period # s (in the example of FIG. 12A, 4).

In an actual page comprising a management information area, even when there is an actual slot to which a management information portion is not written (that is, even when there is an actual slot remainder), the IO control program 501 does not write a user data portion to this actual slot, but allocates another new actual page, and writes the user data portion to this actual page.

Figure 8:
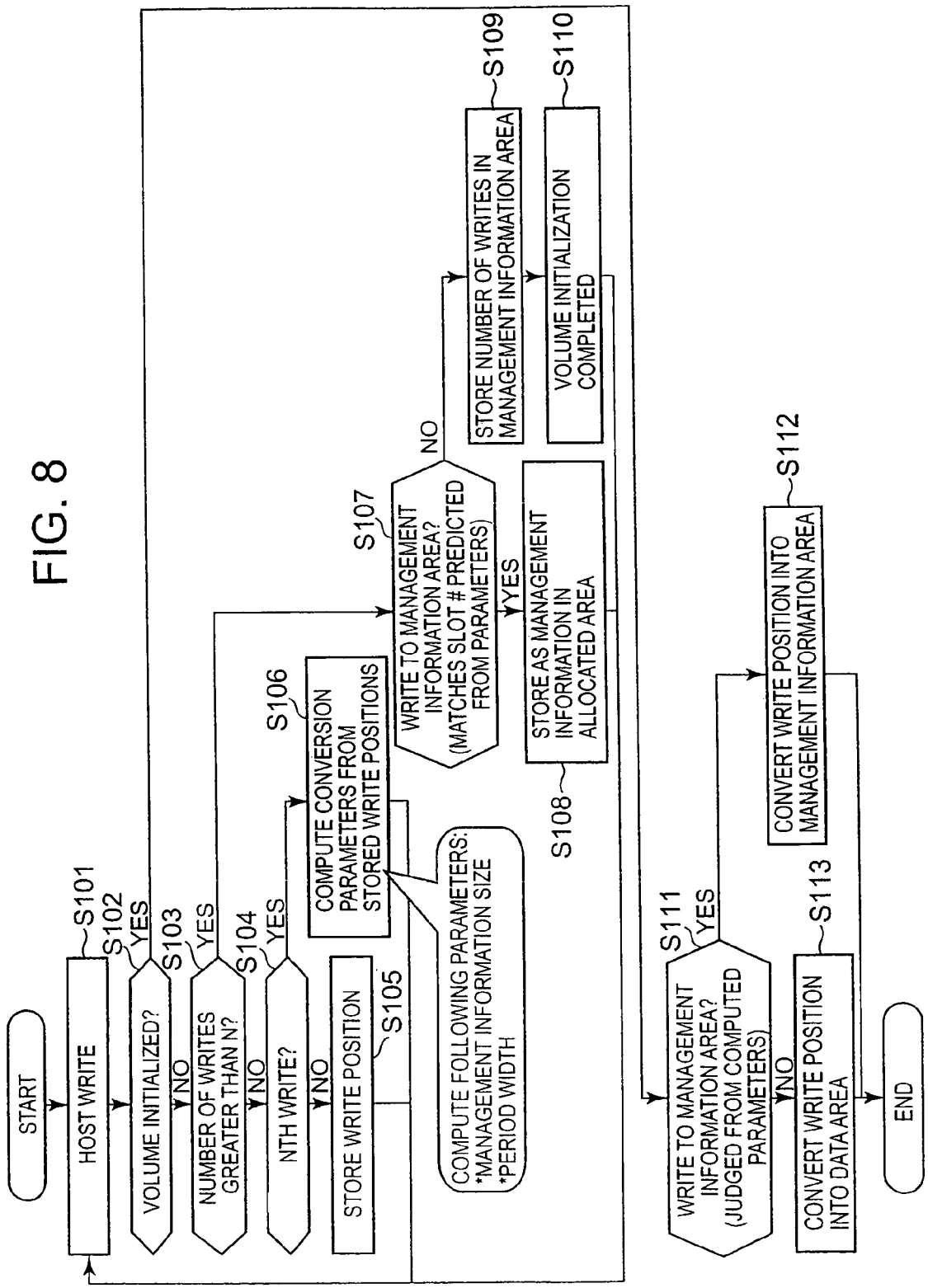
FIG. 8 shows an example of the flow of processing performed by IO control program 501.

FIG. 8 shows an example of the flow of processing performed by the IO control program 501. In this figure, steps are abbreviated as "S".

After the virtual volume is mounted on the host computer 101, host write commands to the virtual volume may occur.

When a host write command occurs (S101), the IO control program 501 judges whether the virtual volume has been initialized (formatted) (S102). If it is judged that the volume has been initialized ("yes" in S102), processing proceeds to S111; if it is judged that the volume has not been initialized ("no" in S102), processing proceeds to S103. In cases resulting in "no" in S102, either initialization has not been begun, or initialization is in progress.

In S103, the IO control program 501 judges whether the number of host write commands (hereafter, the number of write commands) is greater than N. The IO control program 501 can for example count the number of host write commands to the virtual volume, and by comparing the count value with the threshold N, perform this judgment. If the number of write commands is greater than N ("yes" in S103), processing proceeds to S107; otherwise ("no" in S103), processing proceeds to S104.

In S104, the IO control program 501 judges whether the number of write commands is N. If the number of write commands is N ("yes" in S104), processing proceeds to S106; otherwise ("no" in S104), processing proceeds to S105.

In S105, the IO control program 501 includes the current host write command position (that is, information indicating the write destination) in the host write position information 131A. Then, processing returns to S101. In the host write position information 131A, the history of host write positions is arranged in for example a time series (in the order of the number of host write commands). By this means, changes in host write positions can be ascertained, and so it is possible to judge whether the formatting method is the first method or the second method.

In S106, the IO control program 501 judges from the history of host write positions (the manner of changes of the host write position) contained in the host write position information 131A that the formatting method is the first formatting method, and calculates the above-described management information size and period width, as the types of conversion parameters corresponding to the first formatting method. Then processing returns to S101.

In S107, the IO control program 501 judges whether the host write position is in a management information area. Specifically, for example, the IO control program 501 predicts a plurality of virtual slot # s in which management information will be written in the N+1th and subsequent host write operations, based on the calculated management information size (number of virtual slots) and period width, and judges whether the virtual slot # corresponding to the current host write position is one of the predicted plurality of virtual slot # s. In order to determine the virtual slot # corresponding to the current host write position, for example, the formulae explained referring to FIG. 5 may be used; but in the judgment of this S107, it is sufficient to simply judge whether P<B.

Upon judging that the current host write position is a management information area ("yes" in S107), processing proceeds to S108; otherwise ("no" in S107), processing proceeds to S109.

In S108, the IO control program 501 packs and writes management information in an allocated actual page. If the allocated actual page is full, an unallocated actual page is newly allocated, and management information is written to this actual page.

In S109, the IO control program 501 stores the number of host write commands to management information areas in a prescribed storage area (for example, in the host write position information 131A). Then, initialization of the virtual volume ends (S110). The number of host write commands can be used to determine the above-described number of management information data sets in FIG. 12A and FIG. 12B. The number of management information data sets can be used as an offset to determine the leading data (the leading position from which user data is written) (the number of management information data sets is necessary to perform data address conversion).

In S111, the IO control program 501 judges whether the current host write position is in a management information area. Specifically, for example, the IO control program 501 performs judgment similar to the method of S107. Upon judging that the current host write position is in a management information area ("yes" in S111), processing proceeds to S112; otherwise ("no" in S111), processing proceeds to S113.

In S112, the IO control program 501 uses the first conversion formulae (see FIG. 7B) to compute the management information # corresponding to the current host write position (virtual slot #), and moreover acquires the actual page # corresponding to the host write position (virtual page #) from the address conversion table, and writes a management information portion to the location identified by the management information # and actual page #.

In S113, the IO control program 501 uses the third conversion formulae (see FIG. 12B) to compute the data # corresponding to the current host write position (virtual slot #), and moreover acquires the actual page # corresponding to the host write position (virtual page #) from the address conversion table, and writes the user data portion to the location identified from the management information # and actual page #.

The above is an explanation for actual page allocation and writing for the first formatting method. In the above example, the explanation used an example of host writing; but in addition to host writing, first conversion and address conversion table referencing are performed even when a host read operation occurs (that is, when there is a read request specifying a virtual LBA from the host computer).

Next, actual page allocation and writing are explained for the second formatting method. In this case, points which have been explained for the first formatting method are omitted from the explanation or are simplified, and for the most part points of difference are explained.

In the second formatting method, as shown in the example in FIG. 9A and FIG. 9B, the host write position is caused to jump over a prescribed interval the same number of times as the written management information sets (is shifted a fixed interval, without being consecutive), and this is repeated the same number of times as the number of management information portions comprised by the management information. In the example of FIG. 9A, the number of management information sets is 4, and the number of management information portions comprised by one management information set is 3, and so four jumps of the host write position (virtual slot #) are repeated three times. The initial host write position of these repetitions is the next host write position following the previous initial host write position. Management information portions written by host writing each time are written in one actual page insofar as possible.

More specifically, four management information portions (one portion of each of four management information sets) written to the respective virtual slot # s 0, m, 2m, 3m are written to four actual slots of the initially allocated actual page. Next, four management information portions (the next portion of each of four management information sets) written to the respective virtual slot # s 1, m+1, 2m+1, 3m+1 are written to four actual slots of the next allocated actual page. Finally, four management information portions (the last portion of each of four management information sets) written to the respective virtual slot # s 2, m+2, 2m+2, 3m+2 are written to four actual slots of the last allocated actual page. By this means, initialization of the virtual volume is completed.

FIG. 10A explains conversion parameter types calculated in the second formatting method.

As conversion parameter types calculated in the second formatting method, in place of the management information size among the management information size and period width, the total number of periods is calculated. The "total number of periods" is the number of period widths, or in other words, the number of management information sets.

Using these conversion parameters, a fifth conversion to convert a virtual slot # into a management information # can be performed, and conversely, a sixth conversion to convert a management information # into a virtual slot # can be performed. The conversion formulae for these conversion are shown in FIG. 10B. That is, (Fifth conversion: virtual slot #→management information #)

period #=virtual slot #/period width period offset=virtual slot #−period #×period width management information #=period offset×number of management information sets+period #

(Sixth conversion: management information #→virtual slot #)

period offset=management information #/total number of periods period #=management information #−period offset× total number of periods virtual slot #=period #×period width+period offset FIG. 11 shows an example of the flow of processing performed by the IO control program 501. In this figure, steps which are the same as steps processed in FIG. 8 are assigned the same numbers as the numbers assigned in FIG. 8.

In this flow of processing, the fact that the formatting method is the second formatting method can be judged from the host write position information 131A in S106 of FIG. 8. Hence in this flow of processing, the conversion parameter types to be calculated are different (and consequently in FIG. 11 the step is S106'), and there is a step S109B between S109 and S110. In S109B, the size of the management information is calculated. By this means, the management information size, which is not calculated in the second formatting method, is calculated. The management information size is necessary in order to perform address conversion of data.

The above is an explanation of actual page allocation and writing for the second formatting method.

According to the above explanation, in the cases of both the first and the second formatting method, the occurrence of unused areas in actual pages can be suppressed during formatting.

However, as explained above, the first storage system 105A can execute data copying between logical volumes (hereafter, "logical volume" may be abbreviated "VOL"). The copy source VOL may exist in the first storage system 105A, and the copy destination VOL may exist in either of the storage systems 105A or 105B. When the copy destination VOL exists in the first storage system 105A, local copying (data copying within the storage system 105A) is performed; when the copy destination VOL exists in the second storage system 105B, remote copying is performed.

Here, for example, the copy source VOL and copy destination VOL may be virtual VOLs, and when the copy destination VOL exists in the second storage system 105B, the following methods are conceivable as the remote copying method. That is, as a first method, remote copying is executed in actual page units, and after execution of remote copying, each copy destination actual page is allocated to the virtual VOL; and as a second method, each actual slot # of the actual page is converted to a virtual slot #, the virtual LBAs are computed from virtual slot # s, and a write command is issued to the copy destination VOL specifying a virtual LBA. In the first method, conversion processing such as that of the second method can be omitted, and so faster copying can be expected compared with the second method; but in the second storage system 105B it is not possible to ascertain where in the virtual volume management information has been written. In other words, it is not possible to maintain in the second storage system 105B the correspondence relation between the device visible from the host (where management information has been written in the virtual volume, and similar) and the storage device actually used. On the other hand, in the second method the same writing occurs in the copy destination VOL as occurs in the copy source VOL, and so problems such as that with the first method do not occur; however, the above-described conversion processing must be performed each time, so that more time is required for copying.

Hence in this aspect, special measures are taken for copy processing when the copy source VOL is a virtual VOL. This is described in detail below.

For example, when the copy control program 503 receives a copy instruction transmitted from the host computer 101 (or from a management computer, not shown), and copying between VOLs is performed according to the copy instruction, if the copy destination VOL is in the first storage system 105A then local copying is executed, and if the copy destination VOL is in the second storage system 105B then the remote copy control program 505 is caused to execute remote copying. The copy control program 503, upon receiving a copy instruction, can judge whether the copy source VOL is a virtual VOL or an actual volume. Upon judging that the copy source VOL is a virtual VOL, the processing of FIG. 16 is executed.

Figure 16:
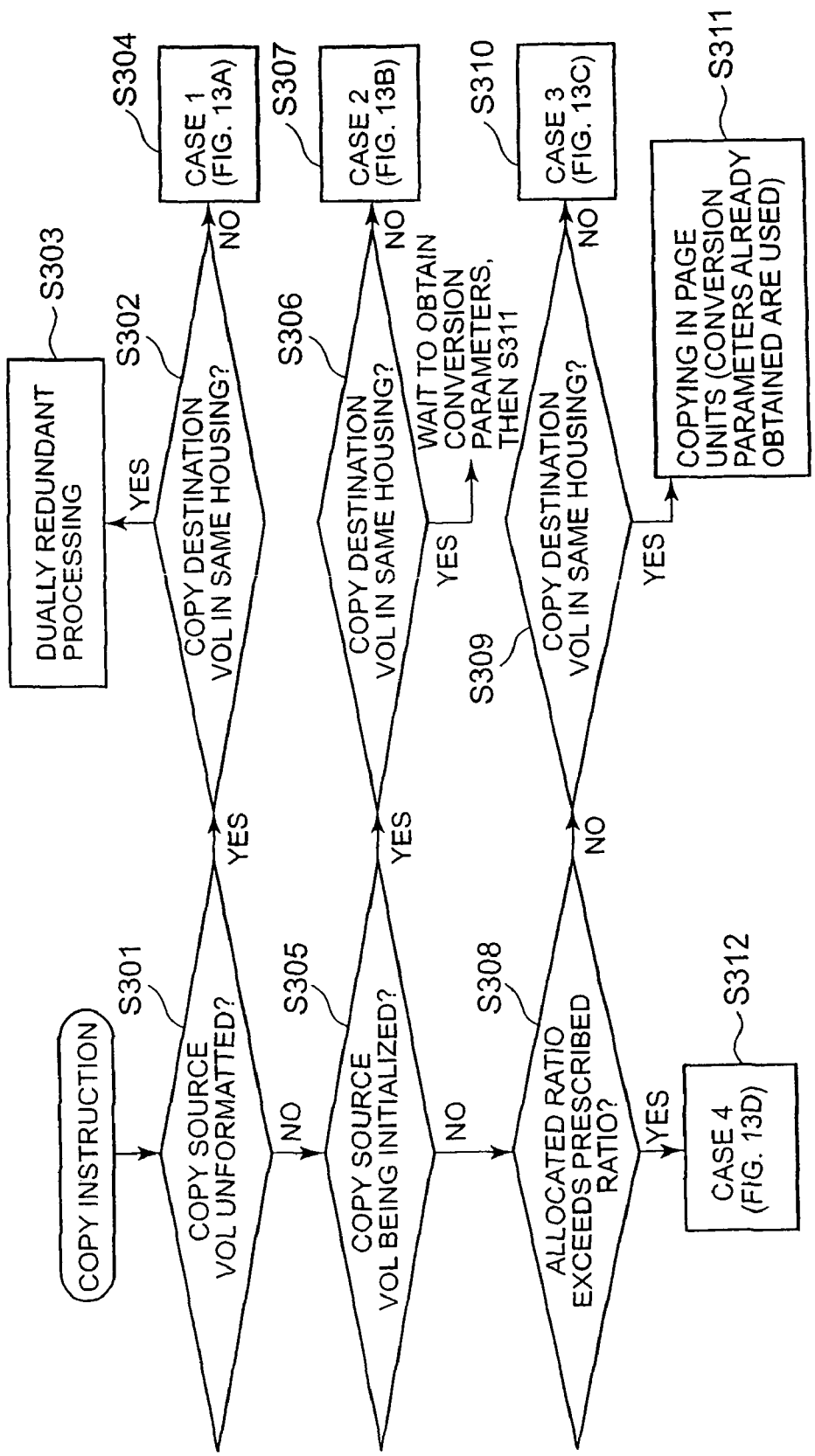
FIG. 16 shows an example of the flow of processing executed when it is judged that the copy source VOL is a virtual VOL.

FIG. 16 shows an example of the flow of processing executed when the copy source VOL is judged to be a virtual VOL.

The copy control program 503 judges whether the copy source VOL is unformatted (S301). If the VOL is judged to be unformatted ("yes" in S301), processing proceeds to S302; otherwise ("no" in S301), processing proceeds to S305.

In S302, the copy control program 503 judges whether the copy destination VOL is within the same housing (that is, within the first storage system 105A). This judgment can be made by for example referencing a pair management table, not shown (for example, comprising copy source VOL identifiers, identifiers of storage systems comprising copy source VOLs, copy destination VOL identifiers, and the identifiers of storage systems comprising copy destination VOLs). When it is judged that the VOL is within the same housing ("yes" in S302), processing proceeds to S303; otherwise ("no" in S302), processing proceeds to S304. Processing executed in S303 and S304 is explained below.

In S305, the copy control program 503 judges whether the copy source VOL is being initialized. This can be performed by, for example, referencing the virtual volume configuration information 133A corresponding to the copy source VOL, and determining whether a conversion parameter group is recorded therein. If it is judged that initialization is in progress ("yes" in S305), processing proceeds to S306; if it is judged that initialization has been completed ("no" in S305), processing proceeds to S308.

In S306, a judgment similar to that of S302 is executed. If the result of S306 is "no", processing proceeds to S307; if the result of S306 is "yes", registration of the conversion parameter group is awaited, and thereafter processing proceeds to S311. Processing executed in S307 is explained below.

In S308, the copy control program 503 judges whether the allocated ratio exceeds a prescribed ratio. The allocated ratio is the ratio of the allocated capacity to the storage capacity of the copy source VOL. The allocated capacity is the total storage capacity of the one or more actual pages which have been allocated to the copy source VOL. If it is judged that the ratio has not been exceeded ("no" in S308), processing proceeds to S309; if it is judged that the ratio has been exceeded ("yes" in S308), processing proceeds to S312. The processing executed in S312 is explained below.

In S309, a judgment similar to that of S302 is executed. If the result of S309 is "no", processing proceeds to S310; if the result of S309 is "yes", processing proceeds to S311. Processing executed in S310 and S311 is explained below.

In FIG. 16, S304, S307, and S310 are processing specific to remote copying, S312 is processing suited to either remote copying or to local copying, and S303 and S311 are processing specific to local copying. Below, each of these types of processing is explained in detail.

Processing of S304 in FIG. 16: Processing of Case 1

Processing is explained referring to FIG. 13A. Case 1 is a case in which, with the virtual VOL in the unformatted state, an instruction for copying from a copy source virtual VOL to a copy destination virtual VOL is received. In this case 1, upon initialization of the copy source virtual VOL, the processing described in FIG. 8 or FIG. 11 is executed not only for the first storage system 105A, but also for the second storage system 105B. Specifically, when for example a host write command occurs for the copy source virtual VOL, the remote copy control program 505 generates in the copy destination virtual VOL a host write operation specifying the same virtual LBA as the virtual LBA specified by the host write command, as in the example of FIG. 17B. At this time, existing remote copy technology can be adopted. That is, so-called synchronous remote copying may be used, or asynchronous remote copying may be used. By this means, formatting of the copy destination virtual VOL progresses according to the progress of formatting in the copy source virtual VOL, and at this time the processing of FIG. 8 or FIG. 11 is executed in the second storage system 105B. As a result, host write position information 131B and virtual volume configuration information 133B corresponding to the copy destination virtual VOL are generated in the shared memory 111B of the second storage system 105B as well.

Processing of S307 in FIG. 16: Processing of Case 2

Processing is explained referring to FIG. 13B. Case 2 is a case in which, when the virtual VOL is being formatted (in a state in which a conversion parameter group has not been registered), an instruction for copying from a copy source virtual VOL to a copy destination virtual VOL is received. In this case 2, processing waits until the conversion parameter group, is calculated and is registered in the virtual volume configuration information 133A corresponding to the copy source virtual VOL; after registration, copying is executed in page units by the remote copy control program 505, and moreover the registered conversion parameter group is transmitted to the second storage system 105B. By this means, the conversion parameter group is registered in the virtual volume configuration information 133B corresponding to the copy destination virtual VOL 105B in the second storage system 105B. Copying in page units is explained in case 3 below.

Processing of S310 in FIG. 16: Processing of Case 3

Processing is explained referring to FIG. 13C. Case 3 is a case in which, when the virtual VOL has been formatted (in a state in which a conversion parameter group has been registered), an instruction for copying from the copy source virtual VOL to the copy destination virtual VOL is received. In this case 3, copying is executed in page units by the remote copy control program 505, as in the example of FIG. 18B, and moreover the registered conversion parameter group is transmitted to the second storage system 105B. Specifically, for example, the remote copy control program 505 transfers the data within the actual page to the second storage system 105B giving priority to smaller actual slot # s. At the second storage system 105B (with processing performed by for example a prescribed program executed by the CHA 109B2), an unallocated actual page is selected, and the transferred data is stored in the selected actual page. At this time, the sizes of the copy source actual page and of the copy destination actual page may be different. In this case also, data is packed and written to the copy destination actual page, and when the page is full, an unallocated actual page is newly selected, and remaining data is written to this page. Then, in the copy destination virtual VOL, actual pages which have become full are allocated in the order of smaller virtual page # s. Specifically, for example, when the actual page #3 first becomes full, and then the actual page #1 becomes full, the actual page with actual page #3 is allocated to the first virtual page which is virtual page #0, and then the actual page with actual page #1 is allocated to the next virtual page (virtual page #1). In accordance with this allocation, an address conversion table is constructed corresponding to the copy destination virtual VOL.

In this case 3, similarly to case 2, the conversion parameter group is transferred from the first storage system 105A to the second storage system 105B, and the conversion parameter group is registered in the virtual volume configuration information 133B corresponding to the copy destination virtual VOL.

Figure 14:
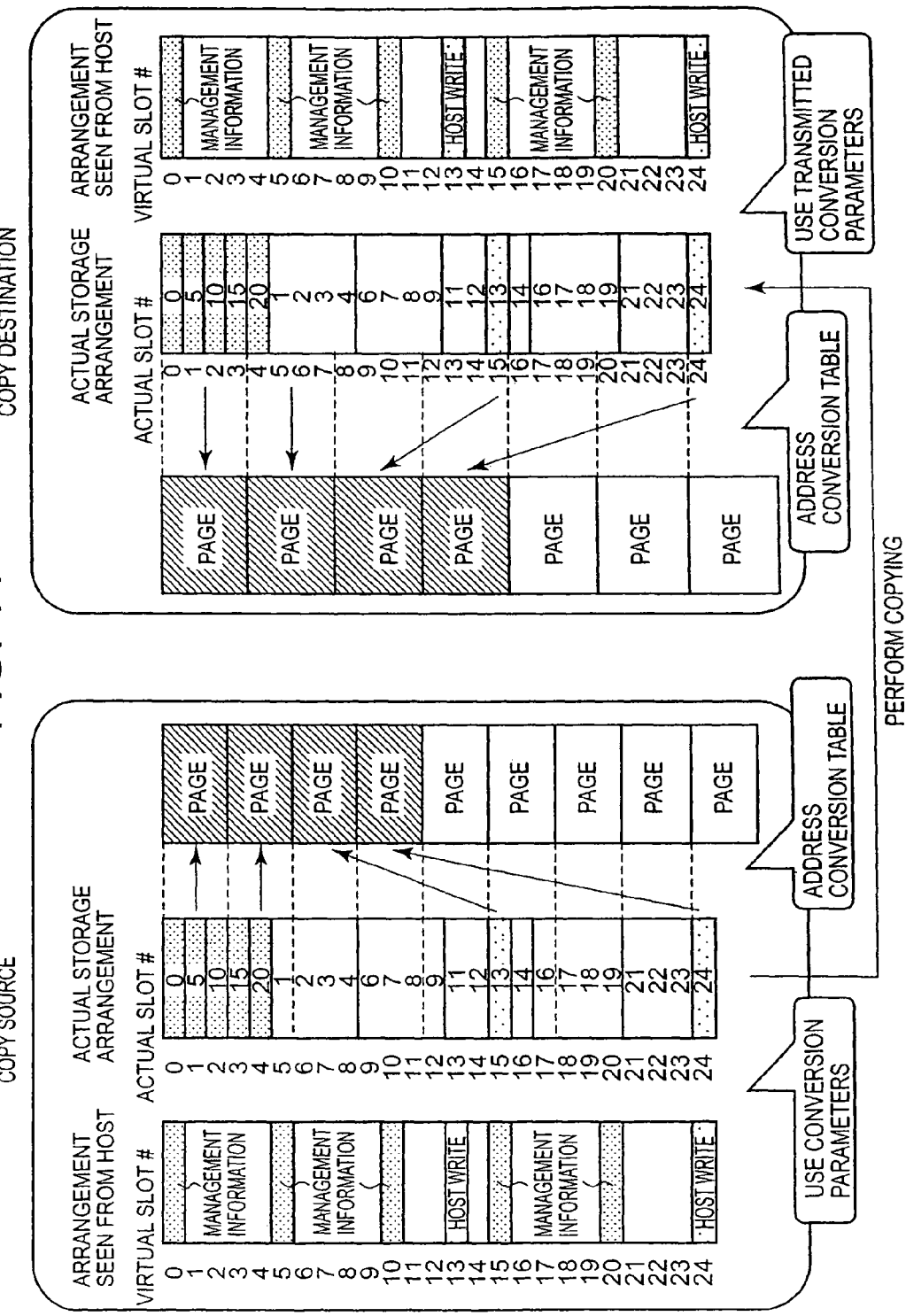
FIG. 14 explains the fact that, in a case in which the remote copy processing of FIG. 13B and FIG. 13C has been executed, the correspondence relation in the first storage system which is the copy source can be maintained in the second storage system which is the copy destination.

By means of the above series of processing, copying can be performed without performing processing each time to convert from an actual slot # (management information #, data #) to a virtual slot #, so that high-speed copying can be expected, and moreover the correspondence relation between the arrangement as seen from the host and the position at which data is actually stored can be maintained even in the second storage system 105B which is the copy destination, as shown in FIG. 14. That is, in the first storage system 105A which is the copy source, when there is an access request from the host computer 101 specifying a virtual LBA of the copy source virtual VOL, the virtual LBA is used to calculate the virtual page # and virtual slot #, and the virtual slot # is converted into the management information # using the conversion parameter group. The actual page # corresponding to the virtual page # is identified from the address conversion table corresponding to the copy source virtual VOL. In the second storage system 105B which is the copy destination, as explained above, the conversion parameter group is registered, and an address conversion table is constructed. By this means, when the copy destination virtual VOL is mounted on the host computer 101 as in FIG. 14, the VOL can be presented in the same way as the copy source virtual VOL. When a read request specifying a virtual LBA of the copy destination virtual VOL is received from the host computer 101, the correspondence relation between the arrangement as seen from the host and the actual storage arrangement is maintained, so that the data desired by the host computer 101 can be reliably provided.

Processing of S312 in FIG. 16: Processing of Case 4

Processing is explained referring to FIG. 13D. Case 4 is a case in which, when the allocated ratio in the copy source virtual VOL has exceeded the prescribed threshold, an instruction is received for copying from the copy source virtual VOL to the copy destination virtual VOL. In this case, if the copy destination VOL is a virtual VOL, the copy control program 503 recommends to the copy instruction source (for example, the host computer 101) that the copy destination VOL be made an actual volume. At the copy instruction source, for example, a message is displayed recommending that the copy destination VOL be made an actual volume. When in response to this message an actual VOL is selected by the user, a copy instruction with the actual VOL as the copy destination is issued to the first storage system 105A. Then, copying between VOLs from the copy source virtual VOL to the copy destination actual VOL is executed. There are two reasons for recommending an actual volume.

(a) Even if the copy destination VOL is a virtual VOL, the allocated ratio exceeds the prescribed ratio, and so the number of actual pages which can be reduced (which are unallocated) is not very large.

(b) If the copy destination VOL is made a virtual VOL, each time there is access of the copy destination virtual VOL from the host computer, the prescribed conversion equations must be used to execute conversion processing, and so access performance is reduced.

The processing of this case 4 is executed when the result of S308 in FIG. 16 is "yes", and if the result of S308 is "no", copying between virtual VOLs is performed. That is, when the allocated ratio is equal to or less than the prescribed ratio, the allocated actual capacity can be reduced in the second storage system 105B, and when the allocated ratio exceeds the prescribed ratio, declines in access performance in the second storage system 105B can be prevented.

Figure 19:
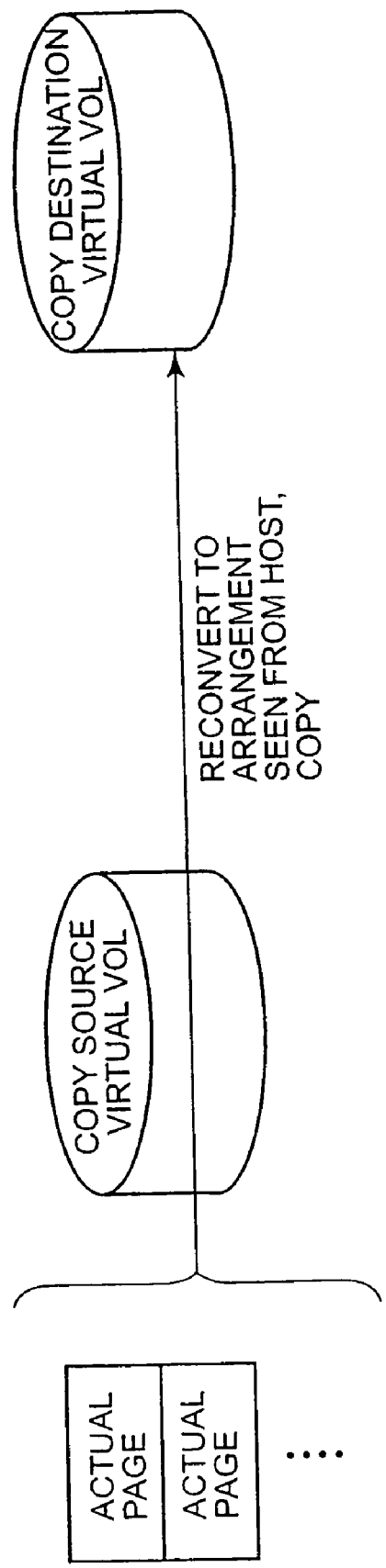
FIG. 19 explains copying from a virtual VOL to an actual VOL.

In this aspect, copying between VOLs from the copy source virtual VOL to the copy destination actual VOL is for example performed as in FIG. 19. That is, the actual slot # is converted into a virtual slot #, and the virtual slot # is converted into a virtual LBA. That is, the storage device actually used is converted, into a storage device which can be seen from the host. Copying to the copy destination actual VOL is performed using this storage device which can be seen from the host. By this means, in contrast with the case of a copy source virtual VOL, when using a copy destination actual VOL the storage device actually used is the same as a device seen from the host.

Processing of S303 in FIG. 16

Figure 17A:
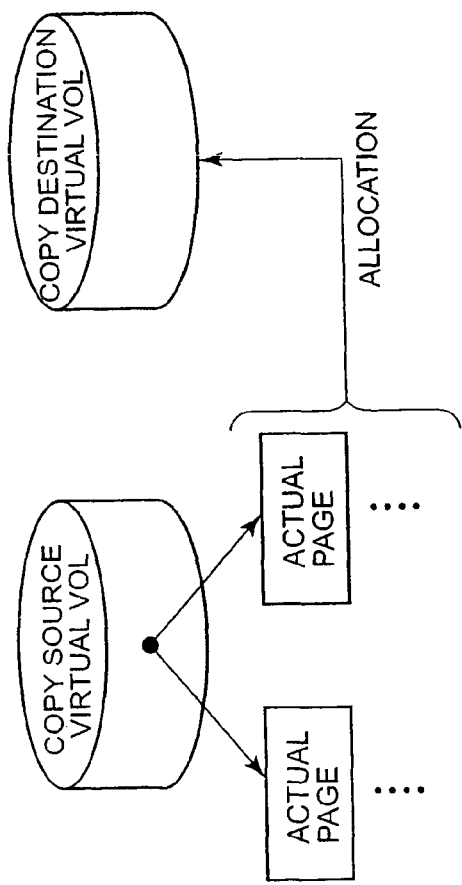
FIG. 17A explains S303 in FIG. 16.
Figure 17B:
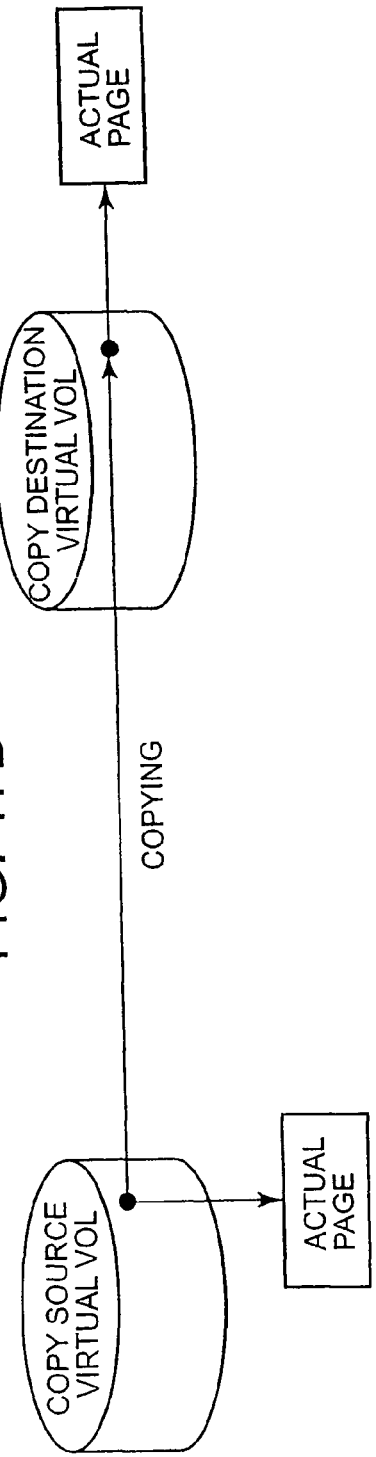
FIG. 17B explains S304 in FIG. 16.

Processing is explained referring to FIG. 17A. The copy control program 503 causes the IO control program 501 to execute the following processing. When the IO control program 501 generates a host write operation in the copy source virtual VOL, and by this means writes data to an actual page, the data is made dually redundant in cache memory 113A, and the dually redundant data is written to two actual pages. At this time, in allocation, the copy source virtual VOL is allocated to one of the two actual pages, and the copy destination virtual VOL is allocated to the other page. When the conversion parameter group is calculated, the conversion parameter group is written to the virtual volume configuration information 133A corresponding to each of the copy source virtual VOL and the copy destination virtual VOL.

Processing of S311 in FIG. 16

Figure 18A:
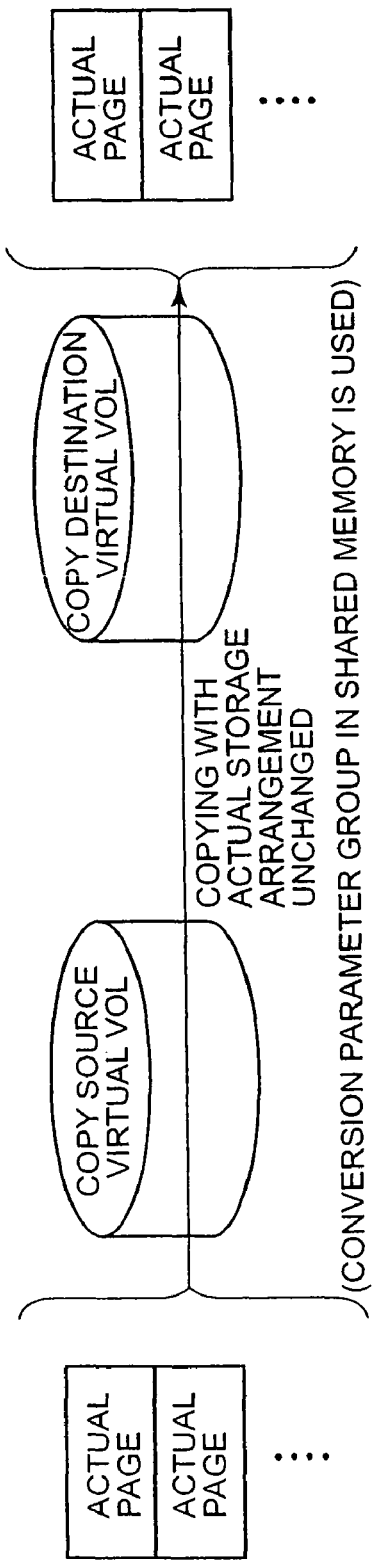
FIG. 18A explains S311 in FIG. 16.
Figure 18B:
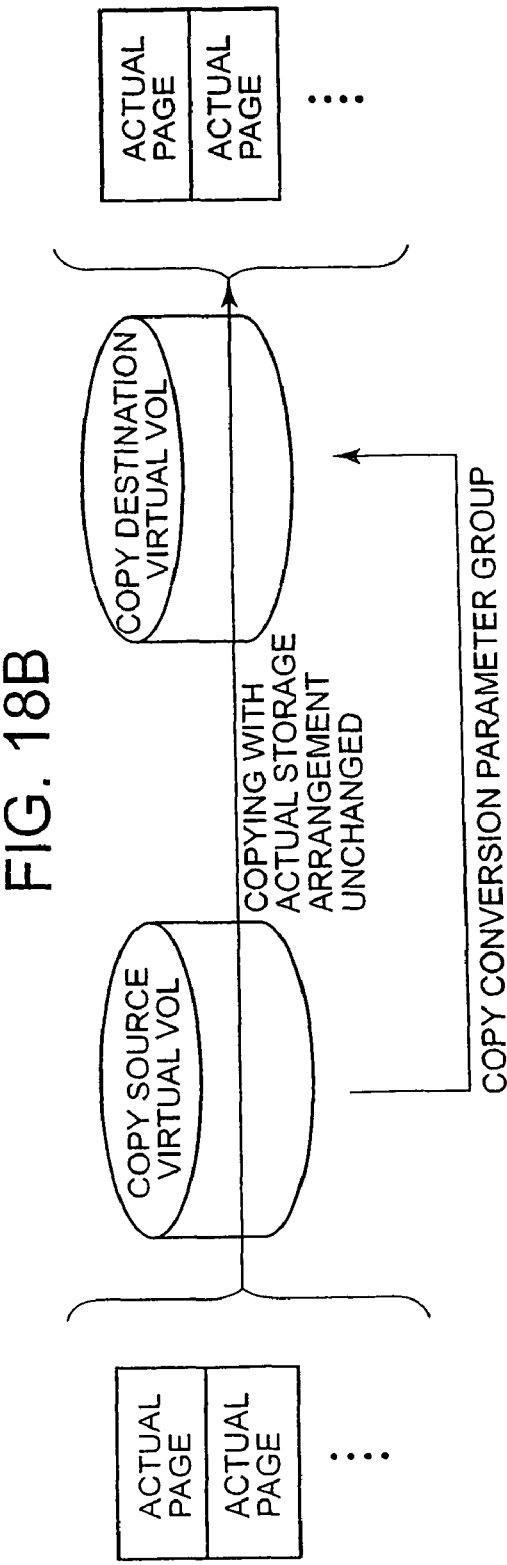
FIG. 18B explains S310 in FIG. 16.

Processing is explained referring to FIG. 18A. The copy control program 503 generates a replica of the allocated actual page in the copy source virtual VOL. Specifically, copying between actual pages is performed, in the order of smaller virtual page # s. More specifically, for example, an unallocated actual page is selected, and the data within the allocated actual page is copied to the selected actual page. Then, the actual page is allocated to a virtual page of the copy destination virtual VOL (the virtual page with the same virtual page # as the virtual page # to which the actual page of the copy source is allocated). At this time, the address conversion table corresponding to the copy destination virtual VOL is updated. The conversion parameter group for conversion of virtual slot # s and actual slot # s is the same as the conversion parameter group corresponding to the copy source virtual VOL (for example, the conversion parameter group in the virtual volume configuration information 133A corresponding to the copy source virtual VOL is copied to the virtual volume configuration information 133A corresponding to the copy destination virtual VOL). By this means, the copy destination virtual VOL can be treated similarly to the copy source virtual VOL.

In the above, preferred aspects of the invention have been explained; but these are examples used to explain the invention, and the scope of the invention is not limited solely to this embodiment. This invention can be implemented in various other modes.

Figure 15:
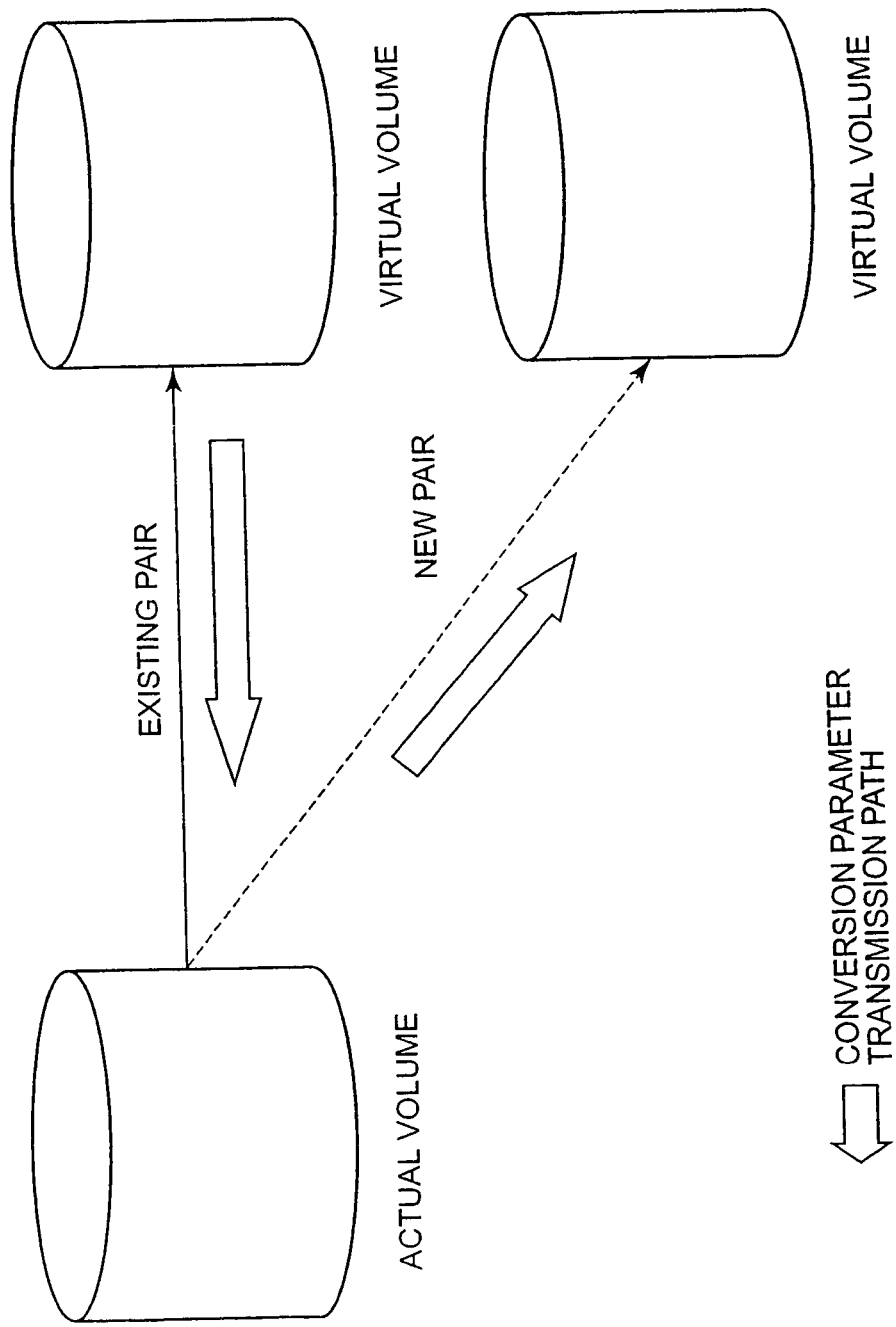
FIG. 15 shows an example of processing when an actual VOL is newly copied, as the copy source, to a copy destination virtual VOL, as a modified example of copying from a copy source virtual VOL to a copy destination actual VOL.

For example, data copying from a copy source virtual VOL to a copy destination virtual VOL may also be performed similarly to copying between virtual VOLs, as in the example of FIG. 15. In this case, for example, when a copy destination actual VOL is taken as a copy source and a volume pair is newly formed with the copy destination virtual VOL, the conversion parameter group can be applied to the new copy destination virtual VOL.

What is claimed is:

1. A storage system, comprising:
a plurality of storage devices;
a controller controlling to read/write of a first type data from/to the plurality of storage devices;
wherein the controller is configured to manage a plurality of virtual volumes and a storage pool, the storage pool corresponding to a plurality of logical volumes provided with a plurality of storage areas in the plurality of storage devices,
wherein the controller is configured to determine, for each virtual volume of the plurality of virtual volumes, a formatting type of the virtual volume based on a pattern of writes from a host to the virtual volume, and to determine whether each received data for each virtual volume is first type data that is data to be written to a virtual storage area of the virtual volume after formatting the virtual volume or second type data that is management information for formatting the virtual volume based on the formatting type determined by the controller for the virtual volume,
wherein the controller is configured to allocate, if a received data is of the first type data and targeted to a virtual storage area of a first virtual volume of the plurality of virtual volumes, a storage area in the storage pool to the virtual storage area of the first virtual volume as a data storage area if allocation is necessary, and to write the received data of the first type data to the storage area allocated as the data storage area,
wherein the controller is configured to allocate, if the received data is of the second type data and targeted to the virtual storage area of the first virtual volume of the plurality of virtual volumes, a storage area in the storage pool to the virtual storage area of the first virtual volume as a management information storage area if allocation is necessary, and to write the received data of the second type data to the storage area allocated as the management information storage area, and
wherein a quantity of storage areas to be allocated to the first virtual volume for writing data of the first type data is greater than a quantity of storage areas to be allocated to the first virtual volume for writing data of the second type data.

2. The storage system according to claim 1, wherein the controller is configured to judge whether each received data is of the second type data at a time of receiving the received data.

3. The storage system according to claim 1, wherein the virtual storage area is shifted at fixed intervals between virtual addresses of the first virtual volume.

4. The storage system according to claim 1, wherein:
the virtual storage area comprises a plurality of sub-virtual storage areas, the storage area comprises a plurality of sub-actual storage areas, a first type of the second type data corresponds to a first sub-virtual storage area of the plurality of sub-virtual storage areas of the virtual storage area and a first sub-actual storage area of the plurality of sub-actual storage areas of the storage area, and a second type of the second type data corresponds to a first sub-virtual storage area of the plurality of sub-virtual storage areas of a second virtual storage area and a second sub-actual storage area of the plurality of sub-actual storage areas of the storage area.

5. The storage system according to claim 1, wherein the controller is configured to receive a copy instruction transmitted from a higher-level device and execute data copying from a copy source logical volume to a copy destination logical volume according to the copy instruction, and the copy source logical volume is the first virtual volume.

6. The storage system according to claim 1, wherein the controller is configured to receive a copy instruction transmitted from a higher-level device and execute data copying from a copy source logical volume to a copy destination logical volume according to the copy instruction, and the copy destination logical volume is a second virtual volume of the plurality of virtual volumes.

7. A data control method in a storage system controlling to read/write data from/to a plurality of storage devices, the data control method comprising:
managing a plurality of virtual volumes and a storage pool, the storage pool corresponding to a plurality of logical volumes provided with a plurality of storage areas of the plurality of storage devices,
determining, for each virtual volume of the plurality of virtual volumes, a formatting type of the virtual volume based on a pattern of writes from a host to the virtual volume,
determining whether each received data for each virtual volume is first type data that is data to be written to a virtual storage area of the virtual volume after formatting the virtual volume or second type data that is management information for formatting the virtual volume based on the formatting type determined for the virtual volume,
allocating, if a received data is of the first type data and targeted to a virtual storage area of a first virtual volume of the plurality of virtual volumes, a storage area in the storage pool to the virtual storage area of the first virtual volume as a data storage area if allocation is necessary,
writing the received data of the first type data to the storage area allocated as the data storage area,
allocating, if the received data is of the second type data and targeted to the virtual storage area of the first virtual volume of the plurality of virtual volumes, a storage area in the storage pool to the virtual storage area of the first virtual volume as a management information storage area if allocation is necessary, and
writing the received data of the second type data to the storage area allocated as the management information storage area,
wherein a quantity of storage areas to be allocated to the first virtual volume for writing data of the first type data is greater than a quantity of storage areas to be allocated to the first virtual volume for writing data of the second type data.

8. The data control method according to claim 7; further comprising judging whether each received data is of the second type data at a time of receiving the received data.

9. The data control method according to claim 7, wherein the virtual storage area is shifted at fixed intervals between virtual addresses of the first virtual volume.

10. The data control method according to claim 7, wherein:
the virtual storage area comprises a plurality of sub-virtual storage areas, the storage area comprises a plurality of sub-actual storage areas, a first type of the second type data corresponds to a first sub-virtual storage area of the plurality of sub-virtual storage areas of the virtual storage area and a first sub-actual storage area of the plurality of sub-actual storage areas of the storage area, and a second type of the second type data corresponds to a first sub-virtual storage area of the plurality of sub-virtual storage areas of a second virtual storage area and a second sub-actual storage area of the plurality of sub-actual storage areas of the storage area.

11. The data control method according to claim 7, further comprising:
receiving a copy instruction transmitted from a higher-level device; and
executing data copying from a copy source logical volume to a copy destination logical volume according to the copy instruction,
wherein the copy source logical volume is the first virtual volume.

12. The data control method according to claim 7, further comprising:
receiving a copy instruction transmitted from a higher-level device; and
executing data copying from a copy source logical volume to a copy destination logical volume according to the copy instruction,
wherein the copy destination logical volume is a second virtual volume of the plurality of virtual volumes.

13. A non-transitory computer readable storage medium having computer readable instructions stored thereon for execution by a processor to perform a method for control to read/write data from/to a plurality of storage devices in a storage system, the method comprising:
managing a plurality of virtual volumes and a storage pool, the storage pool corresponding to a plurality of logical volumes provided with a plurality of storage areas of the plurality of storage devices,
determining, for each virtual volume of the plurality of virtual volumes, a formatting type of the virtual volume based on a pattern of writes from a host to the virtual volume,
determining whether each received data for each virtual volume is first type data that is data to be written to a virtual storage area of the virtual volume after formatting the virtual volume or second type data that is management information for formatting the virtual volume based on the formatting type determined for the virtual volume,
allocating, if a received data is of the first type data and targeted to a virtual storage area of a first virtual volume of the plurality of virtual volumes, a storage area in the storage pool to the virtual storage area of the first virtual volume as a data storage area if allocation is necessary,
writing the received data of the first type data to the storage area allocated as the data storage area,
allocating, if the received data is of the second type data and targeted to the virtual storage area of the first virtual volume of the plurality of virtual volumes, a storage area in the storage pool to the virtual storage area of the first virtual volume as a management information storage area if allocation is necessary, and
writing the received data of the second type data to the storage area allocated as the management information storage area,
wherein a quantity of storage areas to be allocated to the first virtual volume for writing data of the first type data is greater than a quantity of storage areas to be allocated to the first virtual volume for writing data of the second type data.

14. The non-transitory computer readable storage medium according to claim 13, further comprising code judging whether each received data is of the second type data at a time of receiving the received data.

15. The non-transitory computer readable storage medium according to claim 13, wherein the virtual storage area is shifted at fixed intervals between virtual addresses of the first virtual volume.

16. The non-transitory computer readable storage medium according to claim 13, wherein:
the virtual storage area comprises a plurality of sub-virtual storage areas, the storage area comprises a plurality of sub-actual storage areas, a first type of the second type data corresponds to a first sub-virtual storage area of the plurality of sub-virtual storage areas of the virtual storage area and a first sub-actual storage area of the plurality of sub-actual storage areas of the storage area, and a second type of the second type data corresponds to a first sub-virtual storage area of the plurality of sub-virtual storage areas of a second visual storage area and a second sub-actual storage area of the plurality of sub-actual storage areas of the storage area.

17. The non-transitory computer readable storage medium according to claim 13, further comprising:
code receiving a copy instruction transmitted from a higher-level device; and code executing data copying from a copy source logical volume to a copy destination logical volume according to the copy instruction,
wherein the copy source logical volume is the first virtual volume.

18. The non-transitory computer readable storage medium according to claim 13, further comprising:
code receiving a copy instruction transmitted from a higher-level device; and code executing data copying from a copy source logical volume to a copy destination logical volume according to the copy instruction,
wherein the copy destination logical volume is a second virtual volume of the plurality of virtual volumes.

* * * * *